United States Patent
Andreae

(10) Patent No.: US 9,389,145 B2
(45) Date of Patent: Jul. 12, 2016

(54) HYBRID DIESEL ELECTRIC POWERTRAINS AND EMISSIONS TESTING THEREOF

(71) Applicant: Cummins Inc., Columbus, IN (US)

(72) Inventor: Morgan MacKenzie Andreae, Columbus, IN (US)

(73) Assignee: Cummins Inc., Columbus, IN (US)

( * ) Notice: Subject to any disclaimer, the term of this patent is extended or adjusted under 35 U.S.C. 154(b) by 373 days.

(21) Appl. No.: 14/137,112

(22) Filed: Dec. 20, 2013

(65) Prior Publication Data

US 2014/0102187 A1 Apr. 17, 2014

Related U.S. Application Data

(63) Continuation of application No. PCT/US2012/049703, filed on Aug. 6, 2012.

(60) Provisional application No. 61/515,907, filed on Aug. 6, 2011.

(51) Int. Cl.
*G01M 15/00* (2006.01)
*G01M 15/10* (2006.01)

(52) U.S. Cl.
CPC .................................. *G01M 15/102* (2013.01)

(58) Field of Classification Search
CPC .............................. G01M 15/00; G01M 15/102
USPC ............... 73/115.01, 116.01, 116.02, 116.05, 73/116.06
See application file for complete search history.

(56) References Cited

U.S. PATENT DOCUMENTS

| | | |
|---|---|---|
| 4,466,294 A | 8/1984 | Bennington et al. |
| 5,359,308 A | 10/1994 | Sun et al. |
| 5,495,912 A | 3/1996 | Gray, Jr. et al. |
| 6,116,363 A | 9/2000 | Frank |
| 6,367,570 B1 | 4/2002 | Long, III et al. |

(Continued)

FOREIGN PATENT DOCUMENTS

GB 2418898 A 4/2006

OTHER PUBLICATIONS

40 CFR § 86, Jun. 28, 1977. Date amendments noted at each section. [retrieved on Oct. 10, 2012]. Retrieved from the Internet: <URL: http://www.ecfr.gov/cgi-bin/text-idx?c=ecfr&pl=/ecfrbrowse/Title40/40cfr86_main_02.tpl>.

(Continued)

*Primary Examiner* — Eric S McCall
(74) *Attorney, Agent, or Firm* — Taft Stettinius & Hollister LLP

(57) ABSTRACT

Diesel electric hybrid powertrains and methods of operating and testing such powertrains are disclosed. Certain exemplary embodiments comprise test and certification methods in which a controller operates a diesel engine alone, an integrated motor/generator alone, or both the diesel engine and the motor/generator to provide brake torque at a common output shaft according to predetermined duty cycle criteria. Emissions are measured based upon criteria accounting for the effects of regenerative braking, engine shut off, and other operational modes unique to hybrid powertrains. Further exemplary embodiments comprise hybrid powertrain systems and methods of operating the same meeting performance and emissions requirements including respective limits on NOx, hydrocarbon, particulate matter, CO, and $CO_2$ without reliance conventional emissions reduction devices or techniques.

37 Claims, 12 Drawing Sheets

(56) References Cited

U.S. PATENT DOCUMENTS

| | | | |
|---|---|---|---|
| 6,457,351 B1* | 10/2002 | Yamamoto | G01M 17/0072 73/116.05 |
| 6,570,265 B1 | 5/2003 | Shiraishi et al. | |
| 6,755,022 B2 | 6/2004 | Kim et al. | |
| 7,051,514 B2 | 5/2006 | Midlam-Mohler | |
| 7,104,349 B2 | 9/2006 | Gray, Jr. | |
| 7,395,659 B2 | 7/2008 | Pott | |
| 7,436,081 B2 | 10/2008 | Lane | |
| 7,867,133 B2 | 1/2011 | Petridis et al. | |
| 2002/0170344 A1* | 11/2002 | Pallozzi | G01M 15/10 73/116.02 |
| 2006/0042587 A1 | 3/2006 | Ellinger et al. | |
| 2006/0086546 A1 | 4/2006 | Hu et al. | |
| 2008/0022686 A1 | 1/2008 | Amdall et al. | |
| 2010/0050759 A1* | 3/2010 | Vickio, Jr. | G01M 15/02 73/116.06 |
| 2010/0107750 A1* | 5/2010 | Engstrom | G01M 17/0072 73/116.05 |
| 2010/0162686 A1 | 7/2010 | Miyashita et al. | |
| 2010/0293921 A1 | 11/2010 | Yamato et al. | |
| 2011/0087392 A1* | 4/2011 | Kshatriya | B60K 6/485 701/22 |
| 2011/0191079 A1 | 8/2011 | Rzehorska et al. | |
| 2013/0312486 A1* | 11/2013 | Nakagawa | G01N 1/2252 73/23.31 |
| 2013/0312489 A1* | 11/2013 | Watanabe | G01M 15/102 73/23.31 |
| 2015/0101421 A1* | 4/2015 | Takahashi | H02P 6/06 73/862.325 |

OTHER PUBLICATIONS

DieselNet.Emission Test Cycles. Heavy-Duty FTP Transient Cycle. Jul. 8, 2011. [retrieved on Oct. 10, 2012]. Retrieved from the Internet<URL: http://web.archive.org/web/20110708230512/http://www.dieselnet.com/standards/cycles/ftp_trans.html>.

40 CFR § 1065. Jul. 13, 2005. Date amendments noted at each section. [retrieved on Oct. 10, 2012]. Retrieved from the Internet: <URL: http://www.ecfr.gov/cgi-bin/text-idx? c=ecfr &tpl=ecfrbrowse/Title40/40cfr1065_main_02.tpl>.

International Search Report and Written Opinion, pp. 1-10, International Searching Authority, Alexandria, Virginia, PCT/US2012/049703, Oct. 26, 2012.

Regulation of Emissions from Commercial Hybrid Vehicles, Aug. 9, 2010, pp. 1-23, "Technologies and Approaches to Reducing Fuel Consumption of Medium and Heavy Duty Vehicles", National Academy Press.

\* cited by examiner

HYBRID DIESEL ELECTRIC POWERTRAINS AND EMISSIONS TESTING THEREOF

PRIORITY

The present application is a continuation of International Application No. PCT/US2012/049703 filed on Aug. 6, 2012, which claims priority to and the benefit of U.S. Provisional Patent Application No. 61/515,907 filed Aug. 6, 2011, both of which are hereby incorporated by reference in their entirety.

BACKGROUND

The present application generally relates to emissions testing of powertrain systems including a diesel engine and a motor/generator, and unique configurations and operation of such systems meeting or exceeding state of the art performance and emissions criteria.

Diesel engines present unique challenges relative to emissions including a need to simultaneously limit emissions to the environment of so-called criteria emissions including NOx, particulates, hydrocarbons, and CO, as well as limit other emissions including $CO_2$ while also meeting performance requirements. Emissions standards typically require engine output to meet a defined schedule of output shaft torque and speed requirements which simulate a broad range of operating conditions encountered in real world operation.

The United States currently requires heavy duty diesel engines to operate according to the transient FTP duty cycle or steady state SET duty cycle with emissions not exceeding 0.20 grams of NOx per brake horsepower-hour, 0.01 grams of particulate matter per brake horsepower-hour, 0.14 grams of Non-Methane Hydrocarbons (NMHC) per brake horsepower-hour, 15.5 grams of CO per brake horsepower-hour. Details of the FTP and SET duty cycles are known to those of skill in the art and are set forth in 40 CFR 86.007-11, 40 CFR 1065, and 40 CFR 86.1360-2007. Similarly, Europe currently requires heavy duty diesel engines to operate according to the Euro VI standards which require emissions not exceeding 0.40 grams of NOx per brake kilowatt-hour, 0.01 grams of particulate matter per brake kilowatt-hour, 0.13 grams of hydrocarbons per brake kilowatt-hour, 1.5 grams of CO per brake kilowatt-hour. Additionally, $CO_2$ emissions criteria for heavy duty diesel engines are being established. Current proposals are to limit $CO_2$ emissions to less than 500 grams per brake horsepower hour over a test cycle including transients.

To meet competing state of the art emissions and performance requirements, existing systems rely upon combinations of exhaust gas recirculation ("EGR"), variable geometry turbochargers ("VGT"), selective catalytic reduction ("SCR"), and diesel particulate filtration ("DPF"). Reliance on these features has been widely accepted and adopted; so much so that the only engines currently certified to meet the aforementioned emissions requirements rely upon EGR, VGT, SCR, and DPF. While successful, these features impose complexity, cost, and fuel economy penalties as a trade off for emissions control. Some proposed diesel systems rely upon homogeneous combustion modes such as homogeneous charge compression ignition ("HCCI"), homogeneous charge late injection ("HCLI"), other homogeneous combustion modes to reduce emissions, typically in combination with EGR, SCR, DPF, VGT or other techniques. While providing certain emissions benefits over non-homogeneous combustion diesel engines, homogeneous combustion diesel engines pose notoriously difficult control problems and impose significant cost and complexity.

SUMMARY

In contrast to present approaches to testing and certification of diesel engine emissions, the present application discloses test and certification methods and systems in which a diesel engine alone, an integrated motor/generator alone, or both the engine and the motor/generator are selectably controlled to provide brake torque at a common output shaft according to predetermined duty cycle criteria. Emissions can be measured based upon criteria accounting for the effects of regenerative braking, engine shut off, and other operational modes unique to hybrid powertrains. In further contrast to present systems the present application further discloses systems, apparatuses and methods in which a non-homogeneous combustion diesel engine with an integrated motor/generator meet state of the art emissions and performance requirements without reliance on the aforementioned features and their associated cost and complexity, for example, by eliminating one or more of EGR, SCR, DPF, VGT or other conventional techniques.

BRIEF DESCRIPTION OF THE DRAWINGS

The Figures herein provide views and illustrations of various embodiments of the present invention; however, these embodiments are exemplary only and do not limit or restrict any descriptions otherwise provided or inventions claimed herein.

DETAILED DESCRIPTION OF EXEMPLARY EMBODIMENTS

Figure 1:
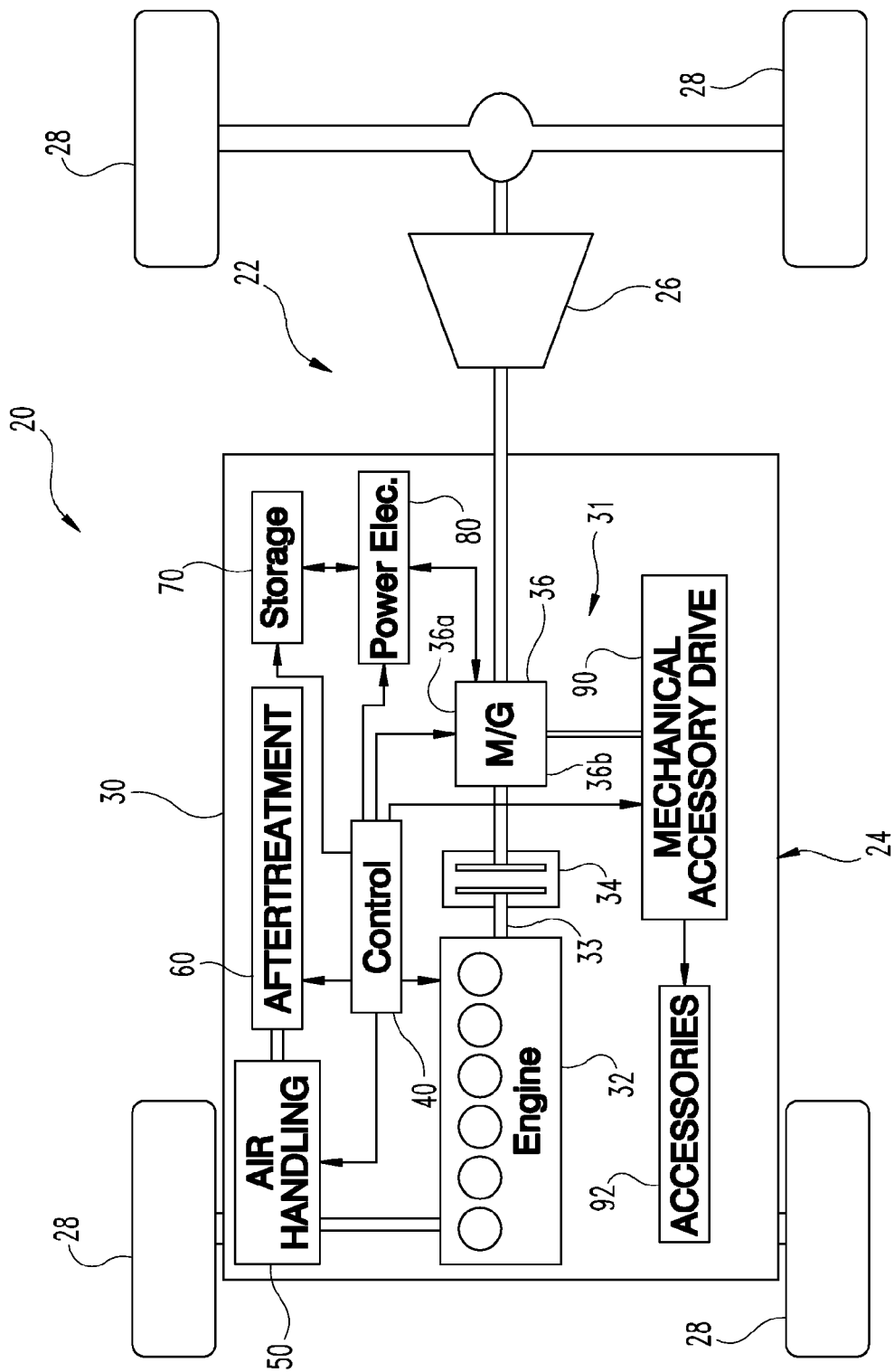
FIG. 1 is a partially diagrammatic view of a vehicle with a hybrid power system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the embodiments illustrated therein as would normally occur to one skilled in the art to which the invention relates are contemplated herein.

With reference to FIG. 1, there is illustrated, a partially diagrammatic view of vehicle 20. Vehicle 20 includes hybrid powertrain 22 which includes a hybrid pretransmission hybrid system 24, a transmission 26, and ground engaging wheels 28. It should be appreciated that in this embodiment, the propulsion of the vehicle is provided by the rear wheels 28; however in other applications front wheel drive and four/all wheel drive approaches are contemplated. In one form vehicle 20 is a form of on-road bus, delivery truck, a service truck or the like. In other forms vehicle 20 may be of a different type, including other types of on-road or off-road vehicles. In still other embodiments it may be a marine vehicle (boat/ship) or other vehicle type. In yet other embodiments, rather than a vehicle, the hybrid powertrain 22, including the pretransmission hybrid power system 24 is applied to stationary applications, such as an engine-driven generator (a Genset), a hybrid system-driven pump, or the like to name just a few possibilities.

Pretransmission hybrid system 24 includes hybrid power system 30. System 30 includes internal combustion engine 32, clutch 34, motor/generator 36, controller device 40, air handling subsystem 50, aftertreatment equipment 60, electrical power storage device 70, electrical power electronics device 80, and mechanical accessory drive subsystem 90. System 30 is in the form of a parallel hybrid power source 31 such that engine 32 and/or motor/generator 36 can provide torque for powertrain 22 depending on whether clutch 34 is engaged or not. It should be appreciated that motor/generator 36 can operate as a motor 36a powered by electricity from storage device 70, or as an electric power generator 36b that captures electric energy. In other operating, motor/generator may be passive such that it is not providing torque to the driveline. In the depicted form, motor/generator 36 has a common rotor and a common stator, and provided as an integrated single unit; however in other embodiments a completely or partially separate motor, generator, rotor, stator, or the like may be integrated with a diesel engine. The designated motor/generator 36 is intended to encompass such variations. Furthermore it should be appreciated that in alternative embodiments of system 30 some of these features, such as clutch 34, air handling subsystem 50, aftertreatment equipment 60, and/or mechanical accessory drive 90 may be absent and/or other optional devices/subsystems may be included (not shown).

For the depicted embodiments, engine 32 is of a four-stroke, diesel-fueled, Compression Ignition (CI) type with multiple cylinders and corresponding reciprocating pistons coupled to crankshaft 33 which is coupled to a flywheel that is coupled to a controllable clutch. Engine 32 may be of a conventional type with configuration and operation modifications to complement operation in system 30. In other embodiments, engine 32 may be of a different type, including different fueling, different operating cycle(s), different ignition, or the like.

Figure 2:
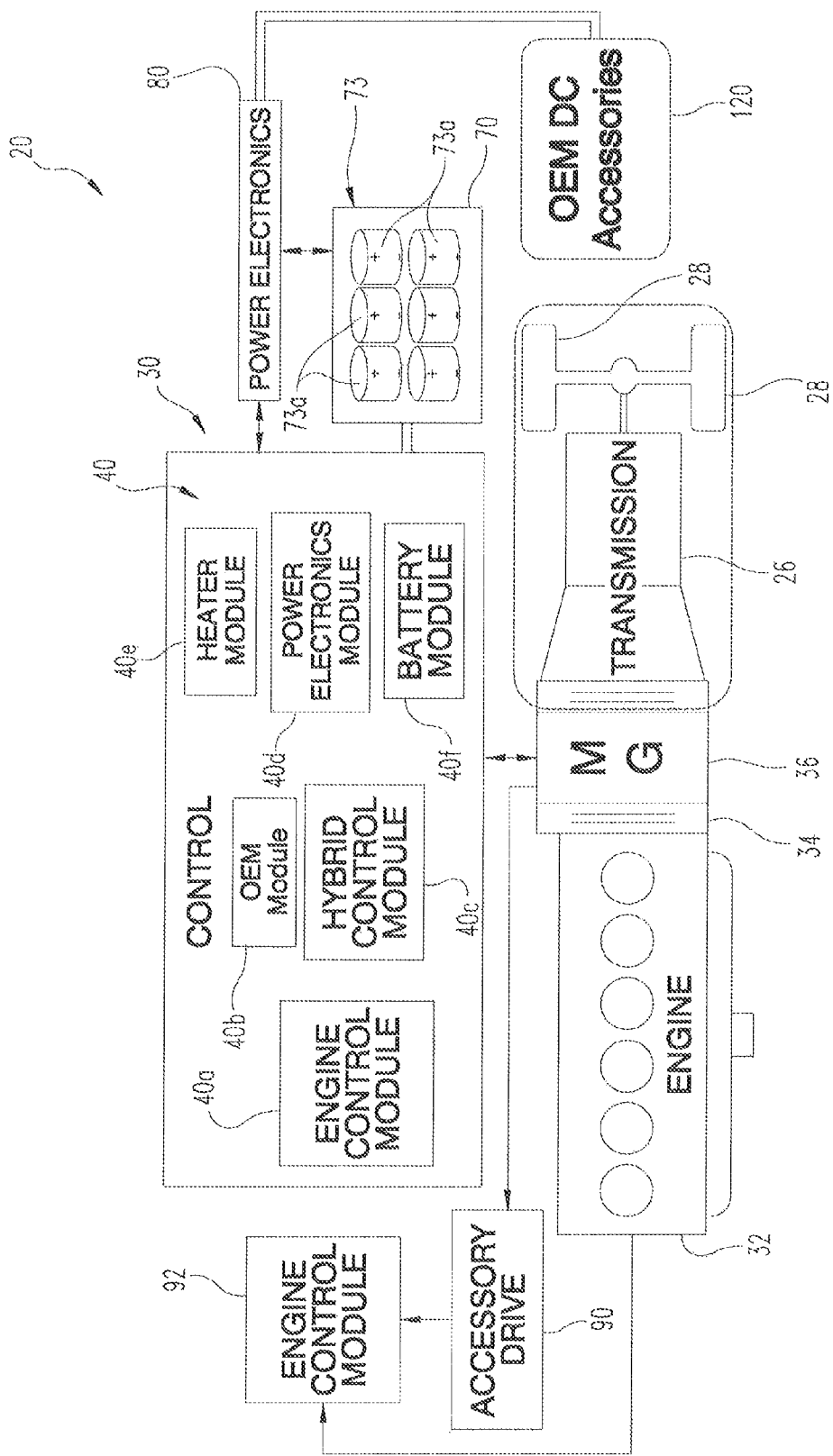
FIG. 2 is a partially diagrammatic view showing further details of the hybrid power system of FIG. 1.

FIG. 2 is a partially diagrammatic view showing further details of the hybrid power system 30 and vehicle 20, where like reference numerals refer to like features as described in connection with FIG. 1. FIG. 2 further illustrates various control modules of controller device 40, including Engine Control Module (ECM) 40a, Original Equipment Manufacturer (OEM) module 40b, Hybrid Control Module (HCM) 40c, Power Electronics Module (PEM) 40d, heater control module 40e, and Battery Control Module (BCM) 40f.

It should be appreciated that controller device 40 can be implemented in any of a number of ways which combine or distribute the control function across one or more control units in various manners. Controller device 40 executes operating logic that defines various control, management, and/or regulation functions. This operating logic may be in the form of dedicated hardware, such as a hardwired state machine, analog calculating machine, programming instructions, and/or a different form as would occur to those skilled in the art. Controller device 40 may be provided as a single component, or a collection of operatively coupled components; and may be comprised of digital circuitry, analog circuitry, or a hybrid combination of both of these types. When of a multi-component form, device 40 may have one or more components remotely located relative to the others in a distributed arrangement. Device 40 can include multiple processing units arranged to operate independently, in a pipeline processing arrangement, in a parallel processing arrangement, or the like. In one embodiment, controller device 40 includes several programmable microprocessing units of a solid-state, integrated circuit type that are disturbed throughout system 30 that each include one or more processing units and memory. For this embodiment, controller device 40 includes a computer network interface to facilitate communications using Controller Area Network (CAN) communications or the like among various system control units.

Controller device 40 and/or any of it constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

It should be appreciated that the depicted modules of controller device 40 refer to certain operating logic dedicated to indicated operations that may each be implemented in a physically separate controller of device 40 and/or may be virtually implemented in the same controller. In the illustrated embodiment ECM 40a, HCM 40c, PEM 40d and BCM 40f are each a physically different digital control unit that implements the corresponding operating logic in the form of programming instructions and/or hardwired digital logic. For this embodiment, the operating logic of OEM module 40b and heater module 40e is implemented in the processing hardware of the HCM 40c as programming instructions and/or hardwired logic. The OEM module 40b provides desired interface operating logic for the given application/vehicle using the hybrid power system 30. Additional operational/functional aspects of modules 40 are described below in connection with FIGS. 3-5. It should be appreciated that other embodiments include one or more control modules which combine the functionalities of two or more of the aforementioned modules.

FIG. 2 further illustrates that storage device 70 is in the form of a battery 73 that includes a number of electrochemical cells 73a, only a few of which are specifically depicted and designated by reference numeral to preserve clarity. Separate from system 30, FIG. 2 also depicts mechanically driven accessories 92 for vehicle 20 that are selectively powered by mechanical linkage with accessory drive 90 when engine 32 is not operating. Accessory drive 90 is in turn powered by motor-provided torque from motor/generator 36. When engine 32 is operating, it supplies the mechanical power needed to drive accessories 92 through standard mechanical linkage (not shown). Also disclosed separate from system 30 are Direct Current (DC) accessories 120 powered by DC electricity stored in device 70 and provided via power electronics 80 as further described in connection with FIG. 3. Accessories 92, 120 may be of any type, including but not limited to, air pressurization pumps, air conditioners, alternators used to maintain charge of a standard battery used for engine starting and/or to power various cabin features and instruments, and hydraulic pumps—just to name a few examples. It is contemplated that the depicted embodiment includes an alternator and starting battery pack separate from the motor/generator 32 and device 70 (not shown); however, in other embodiments they may be absent. Alternatively or additionally, accessories 92 and/or 120 and accompanying accessory drive equipment are absent.

Figure 3:
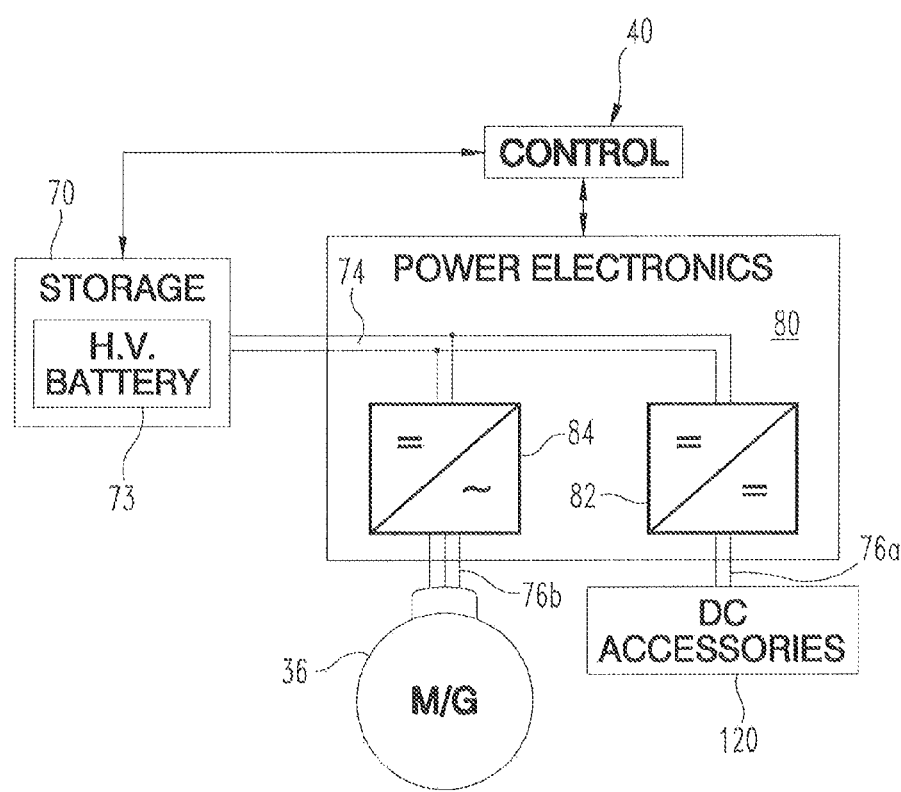
FIG. 3 is a partially diagrammatic view showing further details of selected electromechanical aspects of the hybrid power system of FIG. 1.

FIG. 3 is a partially diagrammatic view showing further details of selected electromechanical aspects of the hybrid power system 30; where like reference numerals refer to like features. Storage device 70 is further illustrated as a high voltage battery pack. In one form, the nominal voltage is approximately 300 volts. Further, in one embodiment, BCM 40f (see FIG. 2) includes operating logic to regulate the thermal condition, state of charge (SOC), voltage, current, and fault status of battery 73, among other things. This embodiment further includes various associated sensors and thermal control apparatus (not shown) to heat or cool battery 73, as needed per the BCM 40f operating logic. Moreover, BCM 40f may be implemented in a hierarchical arrangement of processors provided in device 70, some of which are cell-level specific that report to one or more higher level processors ultimately reporting to a battery system management processor that interfaces with other processing units of device 40 via CAN bus or the like.

FIG. 3 further illustrates that power electronics 80 include DC-to-DC converter 82 that changes the high voltage output of device 70 on high voltage DC bus 74—typically stepping down to a lower voltage, such as 24 or 48 volts or the like, which in turn power accessories 120 via a low voltage on low voltage bus 76a. Power electronics 80 also includes inverter 84 that converts the high voltage DC output on bus 74 to an Alternating Current (AC) output to provide power to motor 36a on AC bus 76b. Typically, this AC output is three-phase, and with the voltage and frequency regulated to be constant within certain acceptable tolerances. Likewise, inverter 84 converts unregulated, varying AC from generator 36b to high DC voltage on high voltage DC bus 74. PEM 40d (see FIG. 2) includes operating logic to implement operations of inverter 84 and converter 82. In one form, PEM 40d is a dedicated controller included within a dedicated power electronics unit that includes converter 82 and inverter 84 separate from other electronics/controllers.

Figure 4:
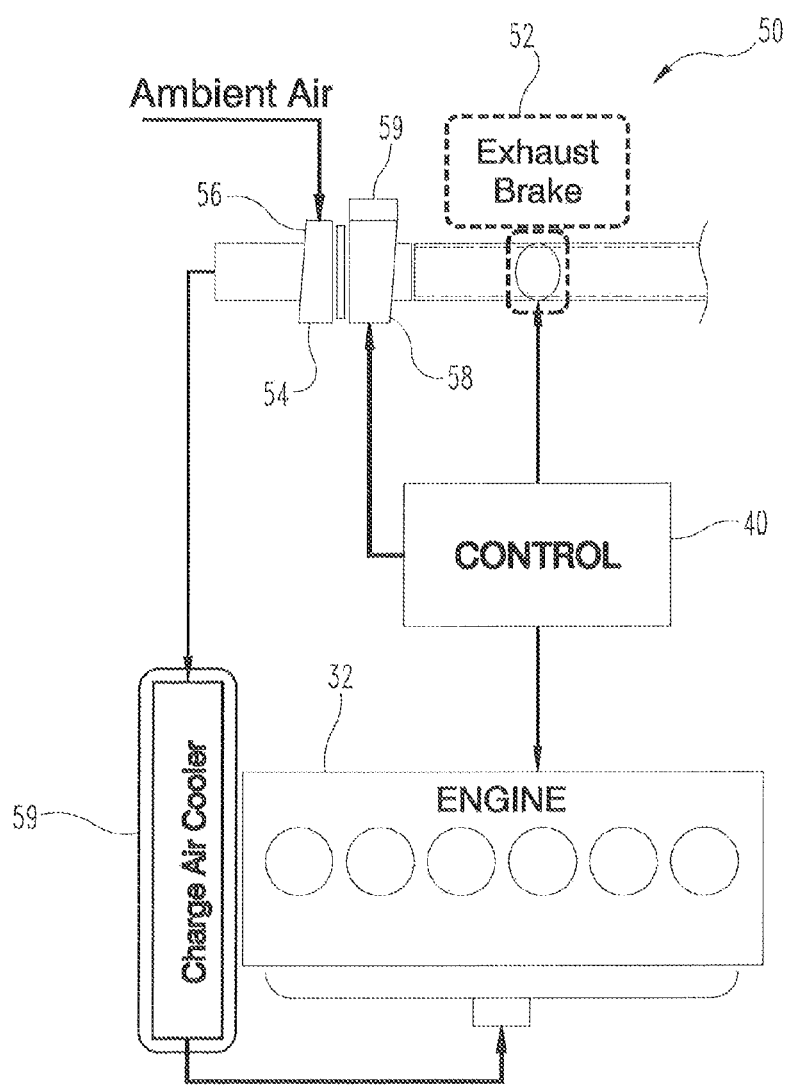
FIG. 4 is a partially diagrammatic view showing further details of the air handling aspects of the hybrid power system of FIG. 1.

FIG. 4 is a partially diagrammatic view showing further details of the air handling aspects of the hybrid power system 30 where like reference numerals previously described refer to like features. Air handling subsystem 50 includes equipment concerning air intake and certain related exhaust handling upstream of aftertreatment equipment 60. Subsystem 50 includes turbocharger 54 which includes a compressor 56 that receives ambient air and pressurizes it for delivery to Charge Air Cooler (CAC) 59. From CAC 59, the pressurized air charge is delivered to the intake of engine 32. The turbocharger 54 further includes a turbine 58 that is driven by exhaust from engine 32. In one form the turbocharger 54 includes a controllable wastegate 59. In certain forms turbocharger 54 is a fixed geometry turbocharger having a large frame size providing high efficiency and slow transient response. Downstream of the exhaust flow from turbocharger 54 is controllable exhaust brake 52. In one form, the operation of air handling subsystem 50 (including controllable brake 52 and wastegate 59) is implemented through operating logic of ECM 40a (see FIG. 2); however, other modules and/or processing devices may partially or completely control various aspects of subsystem 50. It should be appreciated that no form of Exhaust Gas Recirculation (EGR) is included in system 30. In still other embodiments, EGR may be included, turbocharger 54 may be of a Variable Geometry Turbine (VGT) type, a different type, turbocharger 54 may be absent, and/or exhaust brake 52 may be absent.

Figure 5:
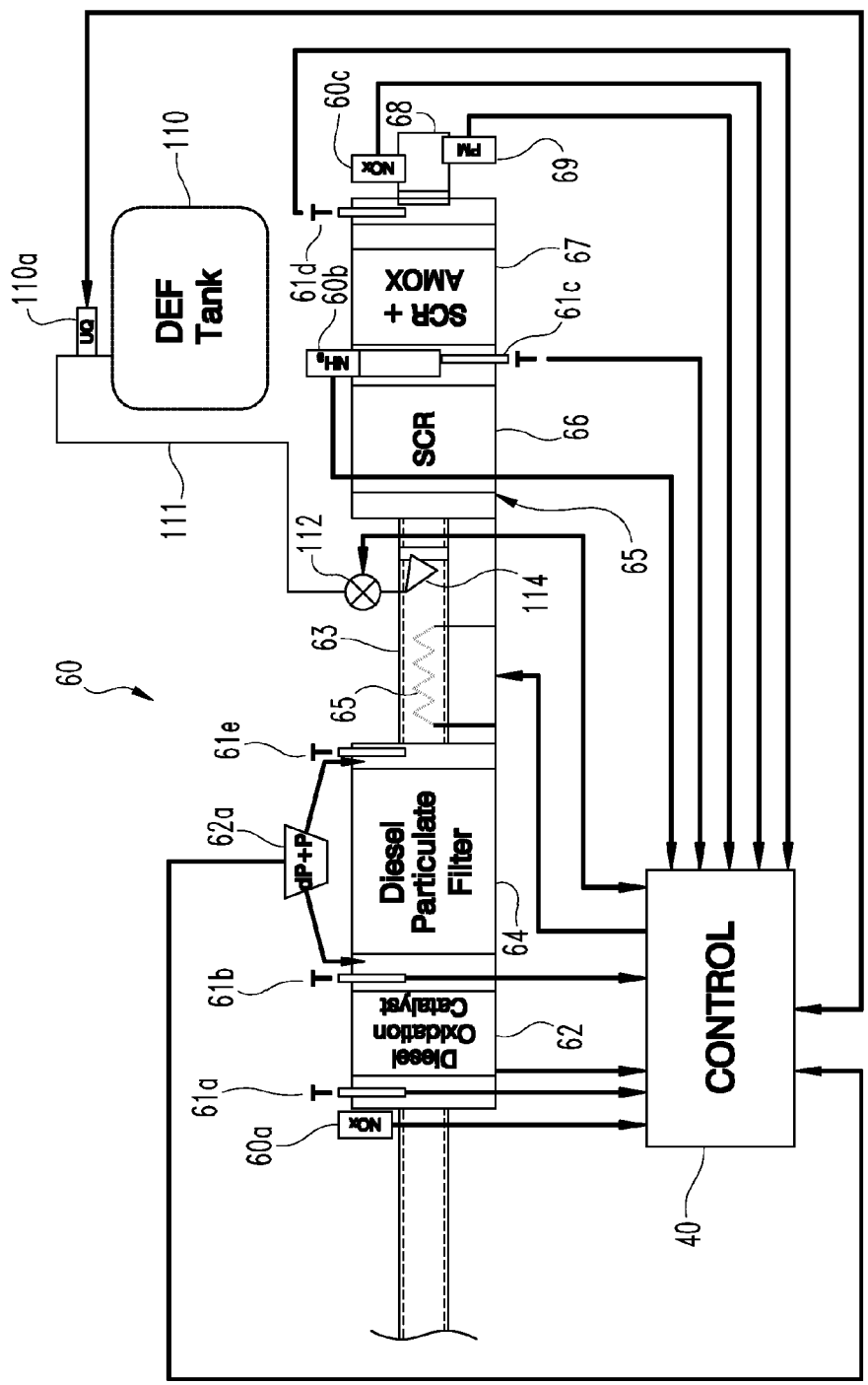
FIG. 5 is a partially diagrammatic view showing further details of the aftertreatment aspects of the hybrid power system of FIG. 1.

FIG. 5 is a partially diagrammatic view showing further details of the aftertreatment aspects of the hybrid power system 30; where like reference numerals previously described refer to like features. Aftertreatment equipment 60 includes upstream NOx sensor 60a, temperature sensor 61a, Diesel Oxidation Catalyst (DOC) 62, temperature sensor 61b, differential pressure sensor 62a, Diesel Particulate Filter (DPF) 64, temperature sensor 61e, decomposition tube 63, resistive heater 65, dosing outlet 114, and Selective Catalyst Reduction (SCR) device 65. The SCR device 65 includes SCR catalytic bed 66, midbed ammonia ($NH_3$) sensor 60b, midbed temperature sensor 61c, SCR catalytic bed 66 that also includes ammonia control (AMOX 67) capability, and temperature sensor 61d. Aftertreatment equipment 60 further includes NOx sensor 60c and Particulate Matter (PM) sensor 69 at the most downstream end before the exhaust flow exits through exhaust outlet 68. Equipment 60 further includes Diesel Exhaust Fluid (DEF) tank 110, level sensor 110a, DEF delivery conduit 111, and controllable DEF delivery valve 112. Certain embodiments omit DPF 64 or substitute a partial flow particulate filter for DPF 64. Certain embodiments exclude SCR device 65. Certain embodiments both exclude an SCR device 65 and exclude DPF 64 or substitute another particulate treatment device having lower efficacy than a DPF.

Operation of equipment 60 is controlled by device 40. In one form, the operating logic of equipment 60 is implemented in a processing device for ECM 40a (See FIG. 2) with the exception of heater 65 which may be controlled in accordance of operating logic of module 40e implement in a processing device for HCM 40c (See FIG. 2). Generally, the sensors of equipment 60 provide inputs as to the performance of equipment 60—including but not limited to maintaining certain desired temperature ranges of the exhaust for each device as monitored with the temperature sensors. DOC 62 receives the exhaust flow from engine 32 downstream of exhaust brake 52. DOC 62 is of a standard type that oxidizes certain compounds to less harmful and/or more desirable components including reduction of soot producing hydrocarbons (HCs), removal of Carbon Monoxide (CO), conversion of $NO_2$ to $NO_3$, and the like, and further better conditions the exhaust for treatment by downstream components of equipment 60. DPF 64 receives the exhaust flow discharged by DOC 62 to remove particulate such as soot. DPF 64 is of a standard type. Differential pressure sensor 62a monitors performance of DPF 64 in conjunction temperature and other operational aspects of engine 32 and equipment 60. DPF 64 is periodically regenerated to convert trapped particulate matter to more desirable compounds for discharge through outlet 68. Downstream, PM sensor 69 monitors whether the DPF is performing correctly providing appropriate signals to controller device 40 to take action as needed. The exhaust flow exits DPF 64 and is received in decomposition conduit 63.

For the depicted arrangement, the DEF composition is a urea dosant that is converted to ammonia in decomposition conduit 63 after passage through nozzle 114 as regulated with valve 112—provided the temperature range of the exhaust in conduit 63 is adequate. In one form, the dosant is provided with air-assistance via outlet 114. The exhaust flow through conduit 63, now including the introduced urea/ammonia dosant, is received by SCR device 65. Generally, ammonia is desired to react with NOx in SCR device 65 to convert it to more desirable substances such as molecular nitrogen ($N_2$) and water ($H_2O$), while minimizing or eliminating any ammonia slip through discharge outlet 68. SCR device 65 is of a split, two-bed type that is monitored/regulated by controller device 40 via input from some or all of the temperature sensors, the NOx sensors 60*a* and 60*c*, and the ammonia sensor 60*b*. Furthermore, temperature within exhaust tube 63 is optionally maintained with heater 65, which is powered by electricity from device 70 in accordance with operating logic of heater module 40*e* (See FIG. 2). In one form, heater module 40*e* is implemented with the same processing device(s) as HCM 40*c* (See FIG. 2) and/or ECM 40*a*. In other embodiments, a different dosant and/or active species may be utilized and/or different aftertreatment arrangement may be utilized including some or none of the components of equipment 60, or may otherwise differ or be absent. Certain embodiments may omit SCR device 65 and treat NOx with a lean NOx trap or other device providing less NOx conversion capacity than SCR device 65, or may omit dedicated NOx aftertreatment devices altogether.

A hybrid powertrain has the capability to meet vehicle wheel and auxiliary power requirements from multiple sources. The hybrid system 30 includes an internal combustion engine 32, and an electrical power system (battery 73, power electronics 80 and motor 32*a*) or hydraulic power system (hydraulic energy storage and pump) (not shown). Hybrids can reduce fuel consumption by capturing and storing vehicle braking energy, which is then utilized later to meet vehicle power requirements—allowing the engine to be operated less but also be operated differently than conventional arrangements. Regenerative braking is the process of using the generator to slow or stop the vehicle, Electricity is generated as the generator slows the vehicle and stored for later use by the system.

Hybrids can achieve fuel consumption reduction through modification of engine operation. Hybrid powertrains allow engine operation to be decoupled from the vehicle power requirements, thereby affecting the traditional relationship between engine output and the work accomplished by the vehicle. The use of stored braking energy allows a reduction in engine work while meeting the same vehicle power requirements. Alternatively or additionally, hybrids present an opportunity to modify engine operation to meet power requirements in a more efficient way. Consequently, the hybrid engine duty cycle can be significantly different from the conventional engine duty cycle. The changes in engine duty cycle impact both $CO_2$ and criteria emissions (such as NOx). The hybrid engine duty cycle can include reduced cycle work, the ability to start and stop the engine independently from vehicle power requirements, increased average load and the opportunity to manage transient loads and exhaust temperatures. Generally, these hybrid-specific operations are governed by the operating logic of HCM 40*e* and BCM 40*f* in the case of system 30.

Optimization of diesel engine design for lowest cost and minimum fuel consumption may be constrained by torque requirements, emissions requirements and transient response requirements. The exemplary embodiments illustrated and described above in connection with FIGS. 1-5 may be provided in a number of unique configurations and may operate in a number of unique operating modes to overcome these constraints.

Conventional engine constraints can be overcome using a motor/generator integrated with a turbocharged diesel engine to provide brake torque at a common output shaft in a variety of configurations and operating modes. These configurations and operating modes allow output and emissions performance to be achieved which cannot be achieved by operation and emissions certification of the engine alone.

The performance and emissions reduction of the diesel engine plus the integrated electric motor/generator can meet or exceed conventional engine performance requirements. The electric motor provides torque and transient response, which enables a number of unique changes in the engine requirements, including but not limited to a reduction in engine peak torque where engine torque is supplemented by motor torque to ensure system torque meets requirements and/or a reduction in engine transient response where engine transient response is supplemented by electric motor transient response and so the system meets emissions, torque and fuel economy requirements.

Integrated controls for engine and electric motor can allow control of the combined system and/or optimization of engine torque and motor torque to meet emissions requirements in unique manners. These approaches may involve increasing or decreasing engine torque (and balancing with less or more electric motor torque) to raise or lower exhaust temperatures for improved AT component performance. In certain embodiments, the diesel hybrid engine includes the replacement of the flywheel with an electric motor and/or a clutch and an electric motor integrated into an extended flywheel housing. It should be appreciated that integrated diesel hybrid engine may permit improved engine optimization including reduced engine peak torque (low speed torque) and reduced engine transient response, integrated control of electric motor, engine and aftertreatment equipment, and/or an electric motor with high torque capability in a very short axial length.

Additionally or alternatively, a wide range of controls and integration are possible. The controls and configurations disclosed herein yield significant fuel consumption reduction over conventional powertrains in part because the engine is used less but also because the engine is configured and operated differently than engines of conventional vehicle powertrains. The ability to use the engine less and to operate the engine differently results from the interactions between the engine and hybrid components and the ability to decouple the engine operation from the vehicle speed and torque requirements. These interactions between engine and hybrid components affect criteria emissions output, in addition to reducing fuel consumption and $CO_2$ emissions. Because of these interactions, the engine and the hybrid components can be certified as a set, for both fuel consumption criteria and $CO_2$ emissions, as well as emissions including particulates, NOx, CO and hydrocarbons, among others. This certification technique has been discovered to permit a number of system configurations that lack features widely accepted as necessary to meet current emissions requirements.

Certain embodiments include a test systems for diesel-electric hybrid powertrains such as those described herein above. An exemplary powertrain for testing includes a diesel engine configured to operate only with non-homogeneous combustion, a turbocharger operatively coupled with the engine, a motor/generator integrated with the engine to provide brake torque at a common output shaft, an energy storage system configured to selectably provide electrical energy to the motor/generator and receive electrical energy from the motor/generator, and an exhaust aftertreatment system configured to reduce one or more types of emissions, for example, particulate matter, NOx, hydrocarbon, and/or CO. The powertrain further includes a powertrain control system including one or more control modules configured to control operation of the engine, the motor/generator, energy storage system, and the aftertreatment system The test system further includes a dynamometer coupled directly to the common output shaft of the powertrain, which may be a pre-transmission output shaft or a post-transmission output shaft in the case where a transmission is included in the tested powertrain.

The above systems are configured to selectably control the engine and the motor/generator to provide brake torque and output shaft speed meeting a predetermined schedule of operating criteria and meeting predetermined emissions criteria including respective limits on particulate, NOx, hydrocarbon, CO and $CO_2$ emissions, and the engine and the exhaust aftertreatment system alone are incapable of providing brake torque meeting the predetermined schedule and meeting the predetermined emissions criteria. In some embodiments the predetermined emissions criteria include particulate matter less than or equal to 0.01 grams per brake horsepower hour, NOx less than or equal to 0.20 grams per brake horsepower hour, non-methane hydrocarbon less than or equal to 0.14 grams per brake horsepower hour, CO less than 15.5 grams per brake horsepower hour, and/or $CO_2$ less than 500 grams per brake horsepower hour over a test cycle including transients.

The engine and the exhaust aftertreatment system alone may be incapable of providing brake torque meeting the predetermined schedule and meeting the predetermined emissions criteria for a variety of reasons. In some embodiments the incapability of the engine and the exhaust aftertreatment system is attributable to a delay in transient torque response of the engine, and the controller is configured compensate for the incapability by controlling the motor/generator to provide positive brake torque during the delay using electrical energy from the energy storage system.

In certain embodiments the engine is provided with a fixed geometry turbocharger with a large frame size that limits transient response of the engine but increases engine efficiency. The integrated motor/generator is controlled to utilize energy from the energy storage system to provide positive brake torque at the common output shaft during transient events which increases the net brake torque to a level needed to meet predetermined performance requirements.

Certain embodiments include an engine with a fixed geometry turbocharger with a large frame size that limits its transient response but increases efficiency. The integrated motor/generator is controlled to utilize energy from the energy storage system to increase the rotational speed of the turbocharger. This can be accomplished with mechanical torque or electrical energy provided to an electric motor coupled with the turbocharger. The increased rotational speed of the turbocharger can be used to enhance its transient performance.

Certain embodiments include a diesel engine with a fixed geometry turbocharger that is unable to meet emissions or performance requirements due to the inability of the turbocharger to change geometry to increase exhaust temperature to a threshold temperature required for aftertreatment system performance. This constraint is overcome by controlling the engine to drive the motor/generator to provide electrical power. The temperature of the exhaust aftertreatment system can be increased by drawing electrical energy from the motor/generator or an energy storage system to power an electrical heater to heat the aftertreatment system. Additionally, the temperature of the exhaust aftertreatment system can be increased by increasing the load on the engine effective to raise exhaust temperature directly. In some forms both techniques are utilized in combination.

Certain embodiments actively limit the transient response of the engine to reduce emissions. In some forms the transient response of a non-homogeneous combustion diesel engine is limited to reduce production of particulate matter, NOx, or both. The limited transient response renders the engine alone unable to meet predetermined performance requirements. The motor/generator is controlled to provide positive brake torque during the transient response to meet the predetermined performance requirements.

Certain embodiments limit the maximum output of the diesel engine effective to reduce emissions and increase fuel economy, but rendering the engine unable to meet predetermined performance requirements such as maximum required brake torque. The motor/generator is controlled to provide positive brake torque to meet the maximum brake torque requirement.

In certain embodiments a first control routine determines the maximum torque available from the engine within an emissions limit and a second control routine determines torque provided by the motor/generator based upon a net torque demand and the maximum torque. The determination may be based upon sensors or virtual sensors detecting or estimating NOx, particulate matter, fueling, and other parameters. The performance limits on the engine are established dynamically rather than being fixed.

Certain embodiments operate without EGR which increases production of NOx at certain engine outputs, for example, high load events. The motor/generator is controlled to provide positive brake torque to meet the output requirements of the high load events. In some embodiments the engine operates with a ratio of intake manifold pressure to exhaust manifold pressure greater than 1 and the incapability of the engine and the exhaust aftertreatment system is attributable to an inability of the aftertreatment system to reduce emissions of the engine at a commanded engine output.

Certain embodiments include an aftertreatment system is configured without a diesel particulate filter and is configured to treat particulate emissions with a partial flow filter having lower particulate reduction capacity than a diesel particulate filter. The reduced particulate treatment capacity is overcome by derating the engine at occurrences of high particulate emission and controlling the motor/generator to provide positive brake torque to meet the output requirements. Certain embodiments include an aftertreatment system is configured without any dedicated particulate filter. The reduced particulate treatment capacity is overcome by derating the engine at occurrences of high particulate emission and controlling the motor/generator to provide positive brake torque to meet the output requirements.

In certain embodiments operating the engine without the motor generator to meet the predetermined schedule of operating criteria provides an aftertreatment system temperature insufficient to meet the predetermined emissions criteria and the motor/generator loads the engine effective to increase temperature of the aftertreatment system to allow the aftertreatment system to meet the predetermined emissions criteria.

In some embodiments the incapability of the engine and the exhaust aftertreatment system is attributable the engine having insufficient maximum output to meet the predetermined schedule of operating criteria, and the controller is configured to meet the predetermined criteria using torque from the motor/generator.

In certain embodiments the incapability of the engine and the exhaust aftertreatment system is attributable the controller limiting engine output to a level insufficient to meet the predetermined schedule of operating criteria, and the controller is configured to meet the predetermined criteria by controlling the motor/generator to provide torque.

In some embodiments operating the engine without the motor generator to meet the predetermined schedule of operating criteria provides an aftertreatment system temperature insufficient to meet the predetermined emissions criteria and the motor/generator loads the engine effective to increase temperature of the aftertreatment system to allow the aftertreatment system to meet the predetermined emissions criteria.

In certain embodiments operating the engine to meet low load output requirements of the predetermined schedule of operating criteria provides aftertreatment system temperature insufficient to meet the predetermined emissions criteria and the system operates the engine only at loads providing aftertreatment system temperature sufficient to meet the predetermined emissions criteria and operates the motor/generator alone at to meet low load output requirements.

The predetermined schedule of operating criteria may be of a number of forms. In some forms the predetermined schedule of operating criteria include a schedule specifying output shaft torque and output shaft speed as a function of time. In some forms the predetermined criteria are include a schedule specifying vehicle speed as a function of time. It shall be appreciated that the features of foregoing embodiments and those described elsewhere herein can be present individually or in combination is a variety of powertrain systems including those disclosed herein.

Having set forth the structures and certain functional aspects of vehicle 20 and system 30, various other operation, testing and performance evaluation techniques for vehicle 20/system 30 are described. The techniques set forth herein enable optimization of diesel engines in new ways leading to improved fuel economy, improved reliability, and reduced cost. The approaches disclose herein have been surprisingly discovered as a way to get the most $CO_2$ reduction while maintaining strict controls over criteria emissions. For pre-transmission or post transmission parallel hybrid architectures, the hybrid powerpack (engine, motor-generator, battery, power electronics and hybrid controls) can be certified using an engine dynamometer based test procedure, along with a unique test cycle. This methodology can also be extended to create a modified test cycle that could then be used for other hybrid configurations (e.g. transmission-integrated, posttransmission or series hybrids, to name a few).

Figure 6:
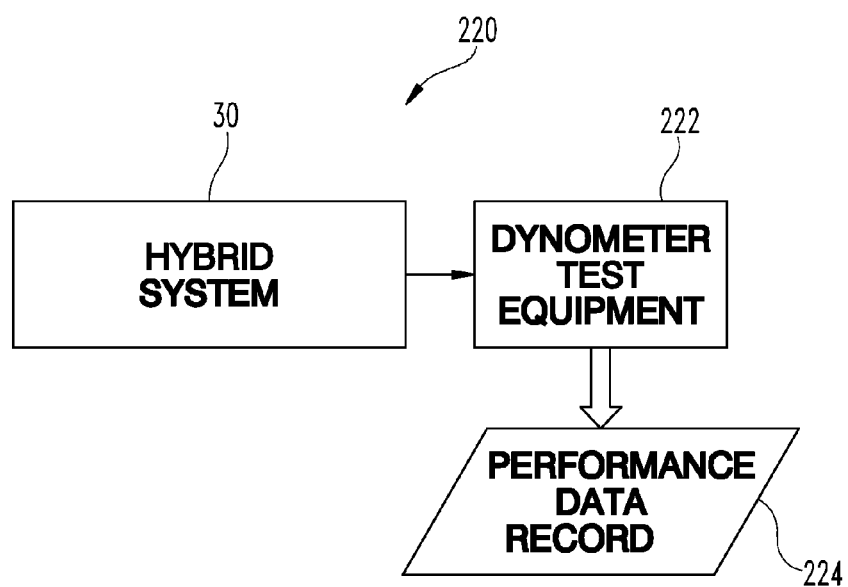
FIG. 6 is a flow diagram illustrating one technique for evaluating compliance of the hybrid power system of FIG. 1 with emissions requirements.

FIG. 6 is a partially diagrammatic view illustrating one technique 220 for evaluating compliance of the hybrid power system 30 of FIG. 1 with emissions requirements. Hybrid system 30 is submitted as a powerpack for testing with dynamometer test equipment 222 in accordance with one or more of the evaluation techniques previously described. Dynamometer test equipment 222 may be provided with one or more computing systems for modeling vehicle characteristics, modeling driver conduct, generating commands for hybrid power system 30, and dynamometer test equipment 222. The test results are documented to provide hybrid system performance information records 224. The test results can further be analyzed relative to established emissions criteria such as those disclosed herein. The test system illustrated in FIG. 6 may be provided in a number of unique forms and may be utilized to conduct a number of exemplary testing methods.

Some exemplary methods of testing emissions of a diesel-electric hybrid powertrain operate on a powertrain including a diesel engine, a motor/generator integrated with the engine to provide brake torque at a common output shaft, and an energy storage system configured to selectably receive electrical energy from the motor/generator and provide electrical energy to the motor/generator. The output shaft is directly coupled to a dynamometer. The powertrain is operated according to a predetermined schedule of operating criteria to provide brake torque at the output shaft using a combination of the engine operating alone, the motor/generator operating alone, and the engine operating with the motor/generator. Emissions of NOx, particulate matter, hydrocarbon, CO, and $CO_2$ over the predetermined schedule of operating criteria are determined using appropriate testing equipment.

In the above methods predetermined schedule of operating criteria may be provided in a number of forms. In some forms the predetermined schedule comprises a schedule of target brake torque as a function of time. In some forms the schedule of target brake torque specifies a percentage of maximum brake torque as a function of time. In some forms the predetermined schedule specifies output shaft torque as a percentage of a maximum output shaft torque of the system as a function of time. In some forms the predetermined schedule comprises a schedule of target vehicle speed as a function of time. In some forms a vehicle simulation determines a simulated vehicle speed based upon dynamometer torque, dynamometer speed, and vehicle model characteristics. The simulation outputs a command to control output of the powertrain based upon the simulated vehicle speed and the target vehicle speed, and outputs a command to control the dynamometer based upon the vehicle model characteristics. In some forms the vehicle model characteristics include a vehicle mass, a rolling resistance, and a vehicle drag. In some forms the vehicle model characteristics include a road grade, and accessory load. In some forms output of the powertrain is controlled to meet the schedule of target vehicle speed using a vehicle model simulation.

In the above methods, during operating the powertrain a predetermined limit is imposed on operation of the powertrain to capture energy from the motor/generator operating alone. In some forms the predetermined limit is based upon a model accounting for a differential ratio, a differential efficiency, a wheel size, a tire characteristic, and a road grade. In some forms the predetermined limit is based upon a fraction of positive work at the common output shaft during the predetermined schedule. In some forms the limit is based upon a simulation of kinetic energy of a vehicle varying over the predetermined schedule.

In some exemplary methods emissions from the powertrain are required to be within respective limits for particulate matter, NOx, hydrocarbon, and CO. In some forms the respective limits comprise particulate matter less than or equal to 0.01 grams per brake horsepower hour, NOx less than or equal to 0.20 grams per brake horsepower hour, non-methane hydrocarbon less than or equal to 0.14 grams per brake horsepower hour, CO less than 1.5 grams per brake horsepower hour. In some forms $CO_2$ emissions from the powertrain are less than 500 grams per brake horsepower hour over a test cycle including transients.

Figure 7:
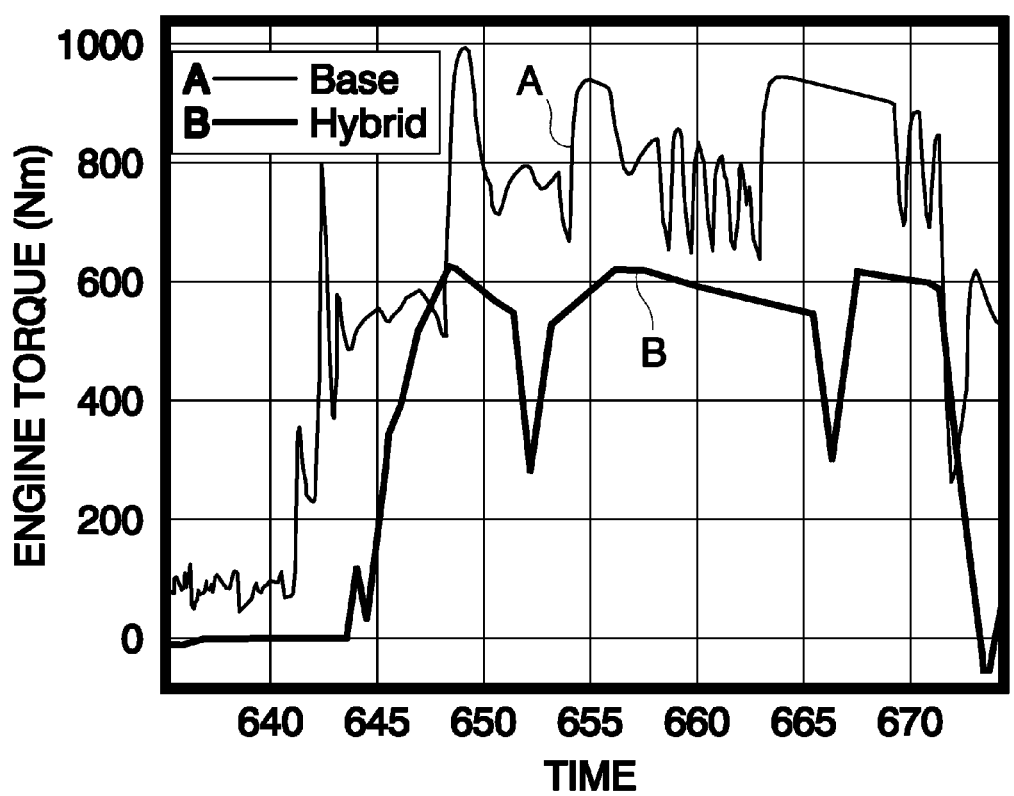
FIG. 7 is a graphic comparison of engine torque for a conventional vehicle to engine torque for the hybrid power system of FIG. 1 versus time.

FIG. 7 depicts engine torque for an engine in a conventional powertrain (curve A) over a portion of a vehicle duty cycle, and engine torque for a given hybrid powertrain (curve B) over the same vehicle duty cycle. In the hybrid case, the engine torque has been managed to reduce transients, reduce peaks and eliminate low load and idle operation as governed by corresponding operating logic. The capability of the hybrid system 30 to capture braking energy and modify engine operation can impact the fuel consumption reduction and impact criteria emissions.

Criteria emissions standards require emissions to be limited across a wide range of vehicle applications, duty cycles and engine technologies. For example, one engine test cycle that was synthesized from actual operating data taken over a number of representative duty cycles, vehicles and engines is the Federal Test Procedure (FTP). While the FTP is not specifically representative of any individual duty cycle, it is adequately representative of all of them. This approach, essentially "engine-in-the-loop simulation," has been used to successfully limit emissions of criteria pollutants. Elements of the FTP can be used to regulate $CO_2$ and criteria emissions from hybrid powertrains using an engine dynamometer based certification of the active components of the hybrid system, also known as the powerpack.

Figure 8:
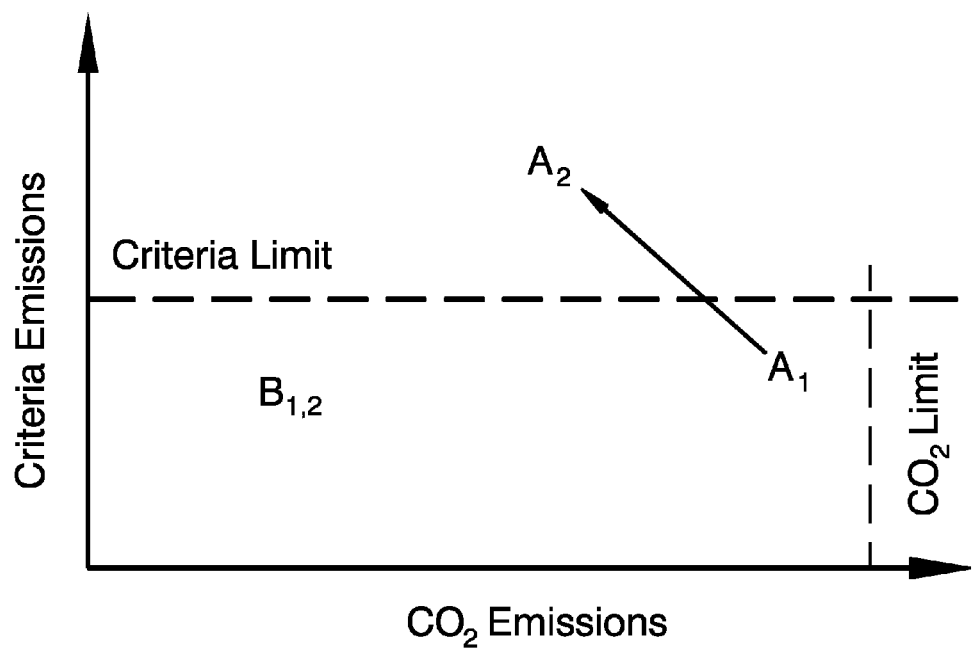
FIG. 8 graphically illustrates the relationship between Carbon Dioxide ($CO_2$) and other Emissions Criteria (such as NOx) with respect to the traditional certification approach and the approach set forth herein.

As previously mentioned, the FTP criteria pollutants certification cycle is representative of engine operation in conventional powertrains across a variety of duty cycles. Because of the interactions between the engine and other active power supply components of the hybrid system (such as system 30), the resulting engine operation and output in a hybrid application can be very different from the net output requirements of a certification cycle. Furthermore, applying an engine that has been dynamometer certified for conventional powertrain in a hybrid powertrain can result in unintended $CO_2$ and criteria emissions output. In one case, an NREL study quantifies this aspect—resulting in a 25% reduction in $CO_2$ emissions with an accompanying 29% increase in NOx emissions. Relying upon an engine certified to meet emissions requirements over an engine duty cycle can result in an engine that does not meet the emissions requirements in real-world hybrid system operation. In the FIG. 8, point A1 represents the $CO_2$ and criteria emission level of a conventional engine which has been dynamometer certified for use in a conventional powertrain and then applied in a conventional powertrain. For this case, the certified emission levels and in-use emission levels match. Point A2 represents the case where the same conventional engine is applied in a hybrid powertrain. Because an engine certification duty cycle is not representative of how the engine operates in the hybrid powertrain, the in-use criteria levels (A2) are not likely to match the certified levels (A1). Controls for hybrid systems that operate both an engine and a motor/generator to meet emissions requirements result in real world, in-use criteria emissions that meet the standards. There are two elements of interest to emissions control for hybrid systems: (a) alignment of certification cycle and real world operation (i.e. representative duty cycle); and (b) alignment of $CO_2$ and criteria emissions (i.e. $CO_2$ and criteria emissions determined on the same duty cycle). For hybrid powertrains, including system 30, one representative certification duty cycle for both $CO_2$ and criteria emissions not only ensures low criteria emissions, but it also enables additional $CO_2$ emissions reductions beyond what is possible today (reference point B1, 2 in FIG. 8). For FIG. 8, the indicated points are again summarized as follows: A1—Conventional engine certification result; A2—Real world result when traditionally certified engine is applied to hybrid; B1—Hybrid certification result; B2—Real world hybrid result with appropriate certification Additional reductions in $CO_2$ are achieved through optimization of engine hardware and calibration for hybrid engine duty cycles. Estimates of these benefits typically range from 5-10% additional fuel consumption improvement and hardware cost reductions—both of which could contribute to increased hybrid technology adoption. One example of potential hybrid engine optimization is the selection of a turbocharger. In a conventional powertrain, the engine duty cycle will require fast transient torque response. In a hybrid powertrain, the torque capability of an electric motor can reduce engine transient torque requirements. A reduction in transient engine torque requirements could enable the selection of a larger turbocharger frame size and/or a fixed geometry for improved efficiency with slower engine response but equivalent power system response. Evaluating and controlling $CO_2$ and criteria emissions in a way that is representative of how the system will operate in the real world requires consideration of not only the engine but also hybrid components like energy storage (batteries) and energy conversion devices (motor, pumps, converters).

Among the embodiments of this application includes a technique to evaluate compliance with one or more emission requirements for hybrid system 30. The present application sets forth a hybrid certification procedure—a hybrid powerpack certification, which can provide representative evaluation for $CO_2$ and criteria emissions for hybrid powertrains. This concept can be desirable for pretransmission hybrid systems, such as system 30. Hybrid powerpack certification for pre-transmission hybrids would properly evaluate performance and would allow application of hybrid systems to a wide range of applications based on a single certification—as is the case with conventional engines. Similar certification tests can be utilized with post transmission hybrid systems.

In a conventional powertrain vehicle power is a function of the vehicle and the vehicle drive cycle. The engine speed and torque output are the same as the speed and torque input to the transmission. For the conventional power requirements, the engine is the only component which can meet vehicle power requirements. Conventional engines are dynamometer certified for criteria emissions using FTP and SET protocols. The certified engine can be installed in many different vehicles. The certified engine operation will meet the criteria emission standards across a range of applications because as previously noted, the certification cycles take into account a representative range of vehicle characteristics and drive cycles. The certification cycles define normalized torque which scales with each particular engine torque curve, assuring that the cycle will be appropriate for a given engine. This approach works well for the commercial market because it provides representative evaluation and reduces certification proliferation.

Next consider the same vehicle and drive cycle, but this time fitted with a hybrid system including an internal combustion engine, such as system 30 as set forth in FIGS. 1-5. The engine 32 and the remainder of the hybrid system 30 each have the capability of delivering power to the wheels 28 or deliver power to meet auxiliary power requirements (such as accessories 92, 120, heater 65, or the like). Both of these are responsive to operational demands and have complex and active control systems that adjust many parameters dynamically during operation. They are also both controlled by a Hybrid Control Module (HCM) 40e that determines the instantaneous proportion of power to be delivered from the engine and from the hybrid drive motor to meet the instantaneous power requirement of the vehicle. In hybrid system 30, the engine 32 burns less fuel and produces less $CO_2$, not only because it does less work but also because it is operating differently. The engine speed and torque are no longer equal to the speed and torque input to transmission because of the other active components in the system.

Figure 9:
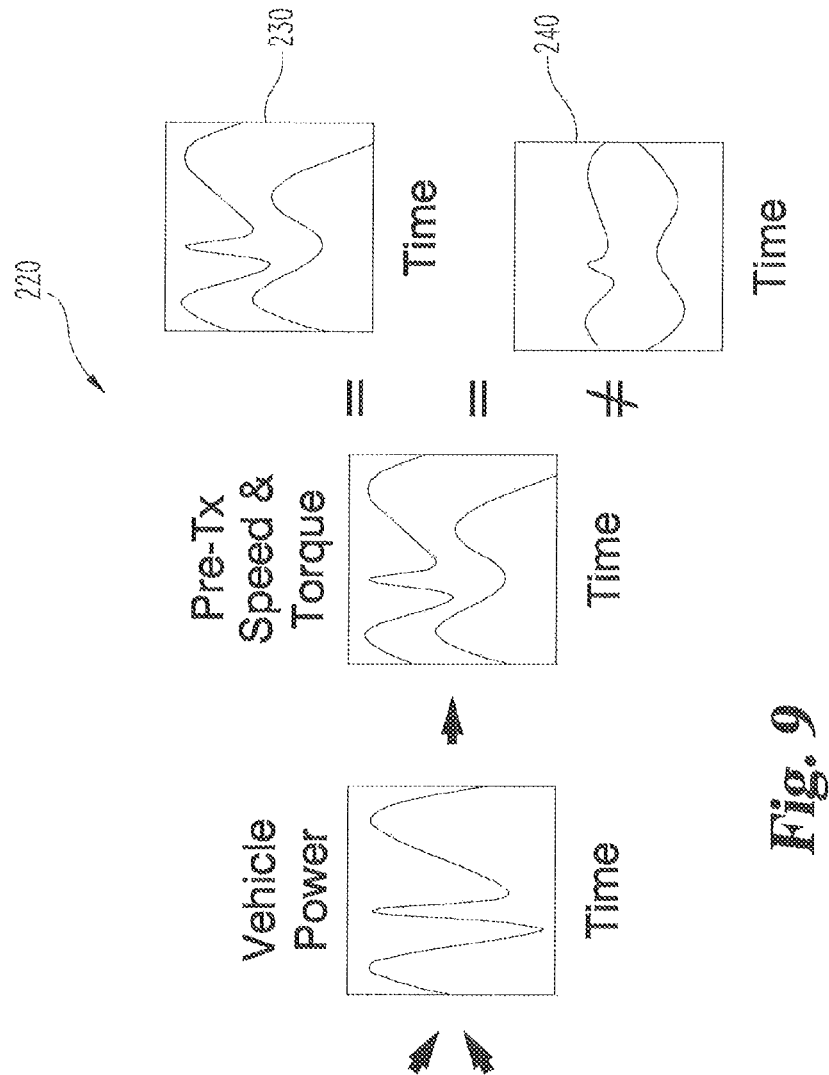
FIG. 9 is a flow diagram illustrating certain characteristics of the vehicle and hybrid power system of FIG. 1.
Figure 9:
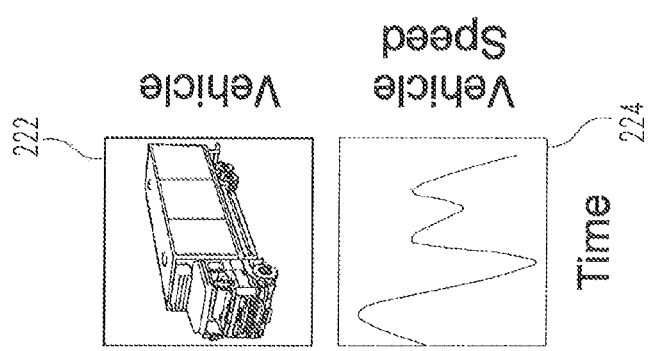

FIG. 9 provides a flow diagram that illustrates how the standard FTP accurately describes the vehicle power requirements, but no longer accurately describes the engine-only speed and torque as represented by the different time charts 230 and 240. In other words, the vehicle power requirements are the same for conventional and hybrid vehicles: both accelerate and decelerate at the same rates, and in both cases auxiliary power requirements must be met. For a hybrid system, such as system 30, the FTP would accurately describe the transmission input positive power requirements.

Dynamometer certification based on the hybrid powerpack concept allows certification of the hybrid system with the engine dynamometer, using a unique modified version of the FTP test protocol. The powerpack output shaft will experience the same positive torque and speed requirements as the output shaft of the engine experiences in conventional vehicles (graph 230). The vehicles, missions and drive cycles have not changed. This certification protocol tests the physical hardware of the powerpack, in a test cell, for both criteria and $CO_2$ emissions, utilizing a modified FTP process. At a high level, the changes to the modified FTP process fall into four areas: (a) the powerpack system torque curve defines the cycle, not just the engine torque curve; (b) allow zero engine speed during the idle portions of the FTP; (c) use only the positive work output in the calculation of cycle work (as is the case in conventional engines); and (d) allow capture of energy during the "motoring" portions of the FTP as reasonable approximation of the regenerative braking that will occur in use.

Figure 10:
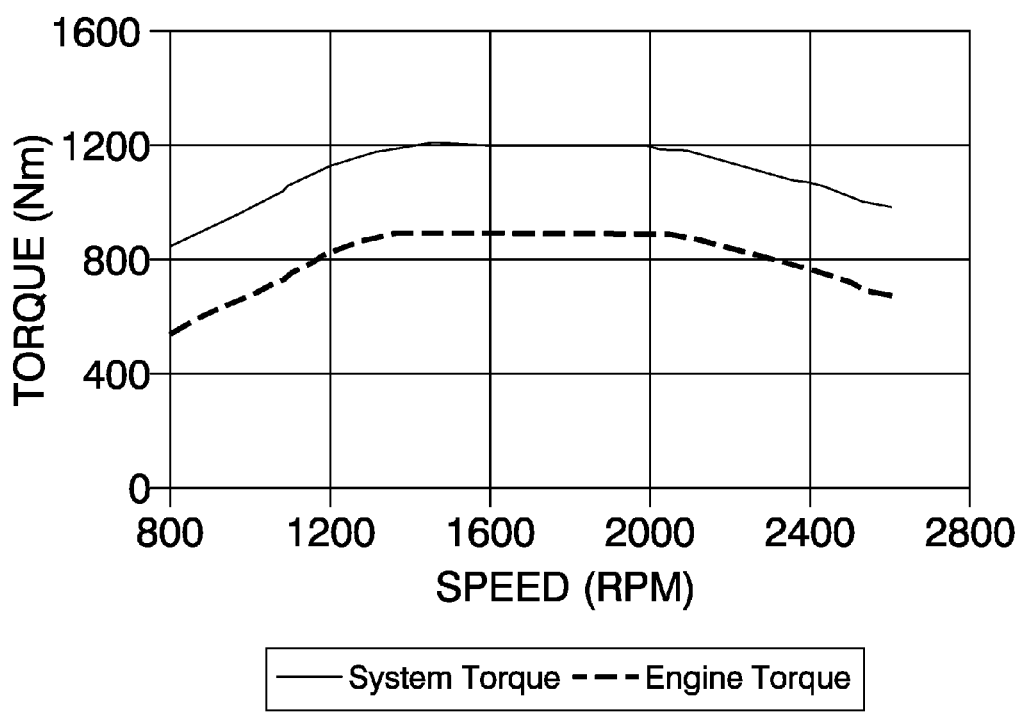
FIG. 10 is a graphic comparison of a conventional engine torque curve versus engine speed to the torque curve versus engine speed for the hybrid system of FIG. 1.

Hybrid vehicles have the same duty cycles as vehicles with conventional powertrains (hybrid buses drive the same routes as conventionally powered buses). For a given vehicle, the positive torque input to the transmission will be defined by the driving requirements and will be the same for conventional powertrains and for pre-transmission hybrids. One difference is that in the pre-transmission hybrid case, speed and torque requirements are met by the hybrid system (system 30) instead of by the engine alone. The powerpack certification concept proposes to use the hybrid system to meet the FTP torque and speed requirements, so it follows that the system torque curve should define the cycle and not the engine alone. FIG. 10 provides a graphic comparison of a conventional engine torque curve versus engine speed to the torque curve versus engine speed for the hybrid system 30.

The FTP contains operating conditions that simulate when the vehicle is at rest and the engine is idling (e.g. at a stop light). In the conventional FTP, the engine goes to idle speed for this portion of the test. Hybrid vehicle duty cycles also contain portions where the vehicle is at rest. Some hybrids take advantage of this reduced vehicle power demand to turn off the engine to reduce fuel consumption. During these zero vehicle speed conditions, if the engine is turned off, the transmission input speed is zero. The alternative power source (most commonly a battery) can meet auxiliary power demands in these circumstances while the engine is off. For the hybrid FTP, it is appropriate to allow the option for the system output speed to go to zero during the "idle" portions, as would be the case in the real world.

In a traditional FTP test, the work is calculated by integrating the positive work over the cycle, and motoring work (negative work) is not included. Emissions levels are calculated by dividing the total emissions by the positive work and have units of grams per brake horsepower-hour (g/bhp-hour). In the powerpack FTP, the emissions calculation should be conducted in the same way as for a traditional engine. That is, the emissions output should be divided by the positive work done. Motoring work is not included in the traditional FTP calculation and similarly negative work should not be included in this calculation, which is further discussed as follows.

The FTP speed and torque define the test cycle positive work, and this work is representative of the energy necessary to meet vehicle requirements. This work remains the same for a given system torque curve whether the system is conventional (an engine) or hybrid (engine +motor +battery). When emissions levels are calculated for a conventional engine, the total emissions generated over the cycle are divided by the total cycle positive work—which is representative of the work required to propel the vehicle. To be representative of real world operation, the emissions calculation for a hybrid modified FTP process must account for this energy recapture rather than treating it as lost energy. This is accomplished by excluding negative work from the cycles work calculation to the extent that regenerative braking would mitigate energy loss.

Capturing energy during motoring portions of the FTP is an approximation of the regenerative braking that will occur in-use. Since the FTP cycle was derived from actual in-use operation of real vehicles, the FTP contains engine operation consistent with a range of vehicle operation—including deceleration (braking/motoring). While the FTP does include a complete description of the positive power required by a vehicle for propulsion, it does not include information related to friction braking requirements. The motoring portions of the FTP properly describe the negative torque that an engine would supply to a transmission, but the FTP does not include the additional negative torque applied to the wheels by the brakes.

Figure 11:
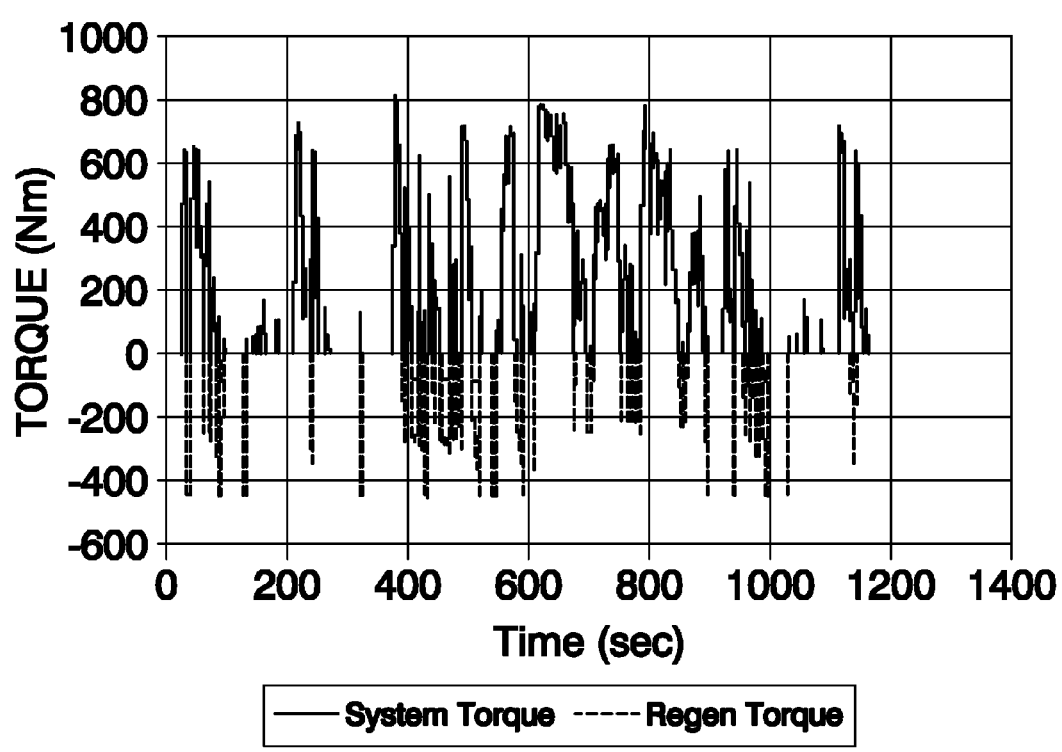
FIG. 11 is a graphic comparison of hybrid power system torque to a modified FTP procedure versus time.

In a pre-transmission hybrid, such as hybrid system 30 can in many cases supply negative torque to the wheels 28 that exceeds the negative torque of engine motoring. In a hybrid powertrain braking energy is captured, stored, and re-used to displace engine operation and reduce fuel consumption. During the motoring portions of the FTP, the powerpack could capture and store energy—in the same way regenerative energy is captured during a vehicle braking event. Selected components would perform in the same manner in the test cell as in real world operation (motor/generator, engine, power electronics, battery and controllers). FIG. 11 provides an example of hybrid power pack torque over the FTP. Negative torque during motoring portions of FTP is defined by capability of the motor and battery.

To ensure that the actual amount of regenerative energy is representative, the generator, batteries and controls are preferably part of the system under test and the battery state of charge at the end of the tests needs to be the same as the beginning of the test. The amount of energy to be captured during the motoring portion of the FTP can be limited in through one of the following techniques: (a) allow capture up to capability of system; (b) place upper limit on energy captured over cycle based on available brake energy in real world cycles; and (c) calculate second-by-second available regeneration torque based on FTP. With respect to calculating second-by-second available regeneration torque based on FTP can also be utilized to develop a posttransmission test cycle that is also based on the FTP. This test cycle could be useful to certify other hybrid architectures (transmission integrated parallel systems, post-transmission systems and series hybrid systems, to name a few).

These three techniques for capturing energy during the motoring portion of the FTP are discussed in more detail as follows. The capture of braking energy presents the largest opportunity for hybrid fuel consumption reduction. For the powerpack certification concept, hybrid regenerative braking can be approximated by allowing the capture of energy during the motoring portions of the FTP cycle. During the motoring portions of the cycle, the hybrid motor would act as a generator and send energy to the energy storage device. For a pre-transmission hybrid (powerpack), the components would function in the same way during the FTP as they would in the real world. The amount of energy captured during the FTP is limited to an amount representative of what would be available in vehicle operation.

In the existing HD Transient FTP dynamometer cycle, positive torque is defined by the torque curve, while negative torque is defined by the engine motoring torque. While the FTP accurately describes vehicle positive power requirements, it does not offer a complete description of vehicle negative torque: the FTP does not include a description of vehicle friction braking. If negative torque is limited to conventional engine motoring torque, the total available braking energy can be potentially under-estimated. If the negative torque is not limited, it might be possible to capture too much energy. Three potential options for ensuring that powerpack energy capture during the FTP is consistent with real world regenerative braking are: (a) energy capture will be limited by system capabilities, and economics will drive appropriate matching between system and real world applications; (b) an upper limit for energy capture can be defined as a fraction of the positive traction work—evaluation of a range of vehicle applications and drive cycles could provide an appropriate limit; and (c) available regeneration torque can be defined second-by-second based on the FTP.

Generally, system capability constrains energy capture. The simplest strategy would be to allow energy capture during the motoring portions of the FTP up to the capability of the hybrid system. A hybrid system with a smaller motor or battery would be able to capture less energy as compared to a system with larger motor and battery. A convenient way to describe the available energy in the motoring portions of the FTP is by comparing captured energy to positive traction energy as a function of the positive and negative power capabilities. A comparison of available FTP energy and real world regenerative braking energy (PSAT simulation) shows a reasonable match. As the size of the motor/generator & battery increases with respect to the system positive power, the regeneration energy captured would increase as well. For a system capable of outputting 100 kW of traction power (engine +motor), and capable of capturing 25 kW of regenerative braking (25 kW battery), the amount of regeneration energy captured on the FTP would be equal to approximately 17% of the positive traction work. For a 100 kW traction power system with 50 kW of regeneration power, energy capture in the FTP would be approximately 35% of the positive work. In simulation results for two cases: a hybrid bus with 100 kW pre-transmission parallel hybrid system over the Manhattan cycle, and beverage delivery vehicle with a 50 kW pre-transmission parallel hybrid system over the HD UDDS drive cycle. In both cases, the energy captured in the FTP matches the simulation results for real world operation quite well. Although this approach does appear to give reasonable results for the two cases shown, it is possible to imagine a hybrid system with a very large electric motor and battery that would capture an unrealistic amount of energy over the motoring portions of the FTP. However, just as is the case with conventional powertrains, economics will drive appropriate matching of hybrid system capability (and size) to applications.

Defining the maximum available regenerative energy is another approach. This alternative defines an upper limit for available regenerative energy over the FTP. Each system would maximize energy capture over the FTP up to the limit. The limit is defined based on evaluation of available braking energy in real world operation. The amount of available brake energy will depend on the vehicle and drive cycle. With respect to the available brake energy for a city bus over the Manhattan cycle, and a delivery vehicle over the HTUF P&D cycle, a hybrid system captures energy during the motoring portions of the FTP up to the capability of the system or the limit. Setting an upper limit to available regeneration energy ensures that energy capture never exceeds the amount of energy available in real world applications.

Use of the FTP to define available regeneration torque as a further option. This third technique defines available regeneration torque second-by-second for the FTP. This approach would link the FTP to vehicle kinetic energy and ensure that available regeneration energy was constrained appropriately. Although the existing HD FTP dynamometer test is an engine test, it is based on vehicle data. The FTP defines engine speed and torque that is representative of a range of applications for conventional powertrains. The engine power meets vehicle power demands, and so with a few assumptions it is possible to calculate vehicle behavior based on the FTP. This calculation of vehicle behavior can then be used to calculate available regeneration energy.

The calculation assumes that FTP defined power is used to meet vehicle power demand. By selecting vehicle characteristics, it is possible to calculate the fraction of engine power that is needed to overcome rolling resistance, aerodynamic drag, driveline losses and accessory loads. The remainder accelerates the vehicle, and in this way vehicle speed can be calculated based on power.

$$\text{Force}_{Engine} - \text{Force}_{Load} = \text{Mass}_{Vehicle} * \text{Acceleration}$$

$$\text{Acceleration} = \frac{P_{Engine}}{MV} = \frac{\frac{1}{2}C_d * \text{Area} * \rho_{Air} * V^2 + MGf_{Rolling} + \frac{P_{Accessory}}{V}}{M}$$

In addition to vehicle assumptions, several cycle assumptions are necessary. The FTP gives a reasonable prediction of positive power requirements for vehicles, but as noted does not include friction braking. Therefore, some assumptions are necessary to calculate deceleration rates. In particular: (a) vehicle speed is assumed to be zero during portions of FTP which contain extended idling; (b) vehicle is assumed to use friction brakes to decelerate to zero speed—an average deceleration rate of 1.5 m/s$^2$ is assumed; and (c) during motoring portions not leading to zero vehicle speed, the vehicle is assumed to coast down (no friction brakes, only engine friction to slow vehicle).

Figure 12:
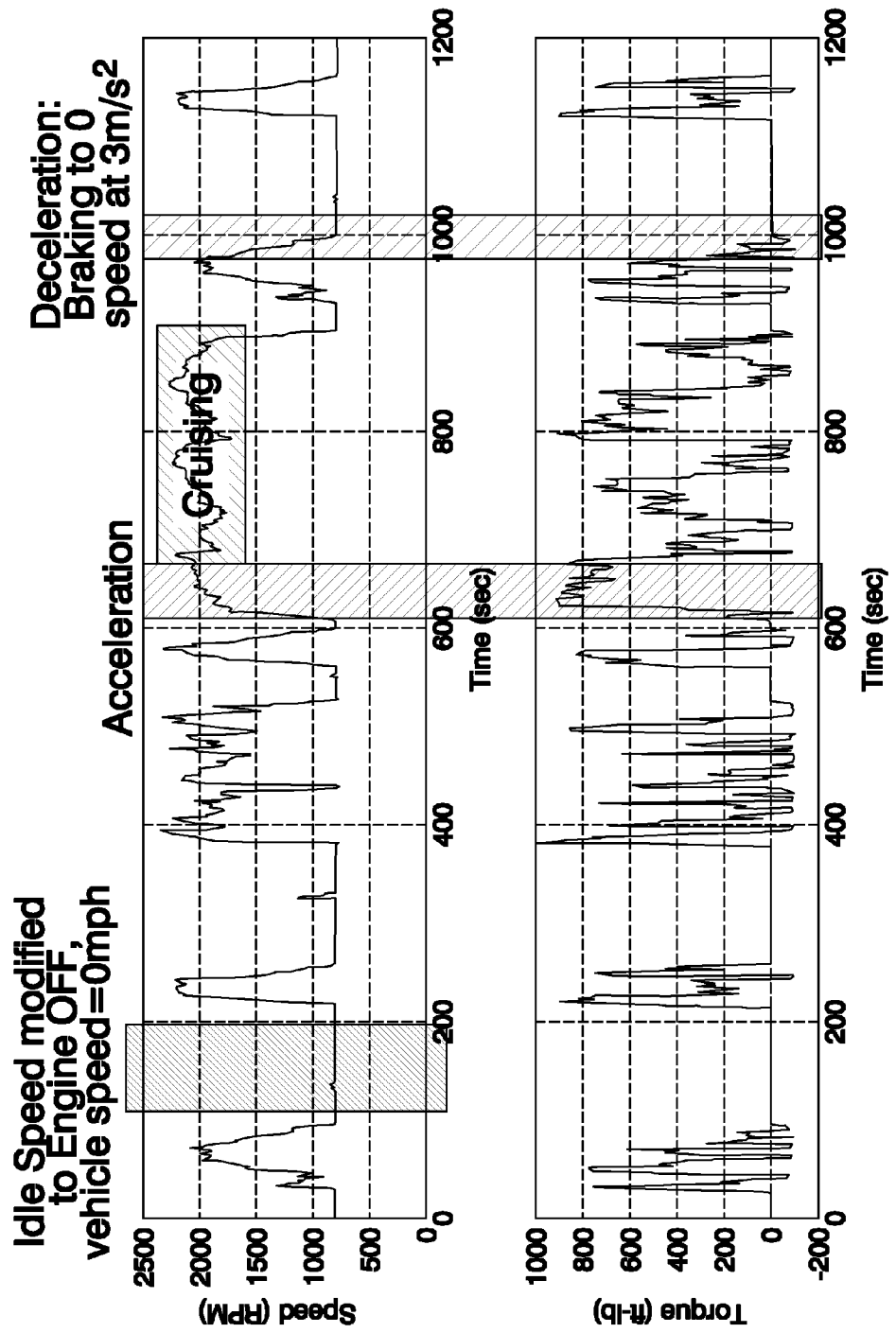
FIG. 12 is a graphic comparison of the modified FTP engine speed to torque versus time with idle, acceleration, cruising, and deceleration indicated by highlights.

FIG. 12 shows the FTP speed and torque for an engine, and assumptions are highlighted. During the acceleration and coast down portions of the cycle, the vehicle acceleration is calculated based on the power and vehicle characteristics. During idle, vehicle speed is zero, and during deceleration to zero speed a constant deceleration rate is assumed.

Using assumptions about drag coefficient, mass, rolling resistance, etc. for a class 8 delivery vehicle, the calculated vehicle speed can be determined. This calculated drive cycle, based on an engine torque curve and some vehicle assumptions, seems to have many characteristics in common with HD vehicle urban drive cycles including similar speed range, acceleration rates and deceleration rates. The calculated vehicle cycle will of course depend on the torque curve initially selected (which defines the FTP speed and torque) and on the vehicle assumptions. After calculating vehicle cycles for a range of different engines and vehicles illustrate that they match reasonably well because the engine power scales with vehicle mass and size. Using this approach to define vehicle speed based on torque curve, also allows the calculation of required deceleration power the vehicle needs to meet the cycle requirements. During coast down periods, the deceleration power is much lower than during vehicle braking. This deceleration power will define available regeneration energy in a realistic way. A comparison of the calculated available regeneration energy based on the above method with the available braking energy in the HD UDDS drive cycle shows a good match.

While the calculated available regeneration energy will depend on the assumptions, analysis indicates that this approach provides a reasonable way to ensure regeneration energy capture during the FTP is appropriately linked to vehicle behavior. This approach also provides one way to develop a post-transmission cycle based on the FTP. Assumption of average tire size and final differential would allow calculation of post-transmission speed based vehicle speed. By combining the vehicle power requirements with the post-transmission speed, it would be possible to define a post-transmission torque. The post-transmission speed and torque can be used for evaluation of a transmission integrated hybrid system, or series hybrid system with a single output shaft. This post-transmission cycle based on the FTP allows comparison of system performance of conventional engine, powerpack, and other hybrid architectures based on the common foundation of the FTP. This approach also defines a vehicle cycle based on the FTP that could be used for chassis certification, and would also allow comparison based on a common cycle.

Next powerpack certification performance is considered versus in-use performance. Powerpack certification will ensure representative evaluation of the system that accounts for interaction of hybrid components and engine. Component operation over the hybrid FTP cycle will be consistent with operation in the real world, as long as the system duty cycle in the real world is consistent with the FTP cycle. The FTP transient cycle was developed to be a representative duty cycle for a range of applications for engines in conventional powertrains—so it is also a representative duty cycle for pre-transmission hybrid systems. However, the added complexity of hybrid powertrains may raise concerns that hybrid operation in-use may differ from certification operation. There are a couple of ways to address this concern. First, all hybrid components would be tested in hardware in the certification test and so could be subject to On-Board Diagnostic (OBD requirements. OBD requirements would ensure that all hybrid components (engine, battery, power electronics, motor, etc.) function properly in-use. Second, all conventional engines are subject to in-use requirements to ensure that real world performance is consistent with certification results. Similar in-use requirements could be applied to powerpack performance. These additional requirements would ensure that powerpack operation would be evaluated over a wide range of conditions, covering real world operation over a range of duty cycles. These same procedures are adequate for conventional engine certification and so would also be appropriate for powerpack certification.

The powerpack certification disclosed herein, by testing all components in the test cell, ensures all interactions between hybrid components and engine are properly evaluated for both $CO_2$ and criteria emissions. Procedures that are available to ensure conventional engine performance (OBD, in-use, etc.) could be applied to powerpack certification. Powerpack certification enables additional $CO_2$ reduction above what is possible today, reduce hardware cost, and thereby speed of adoption of hybrid technology to reduce fuel consumption and $CO_2$ emissions.

A number of further exemplary embodiments will now be described. Certain exemplary embodiments are methods including providing a hybrid power system including an internal combustion engine, a generator, and an electric power storage device, producing mechanical power with the engine during a first operating mode of the hybrid power system, during a second operating mode of the hybrid power system, converting mechanical energy to electrical energy with the generator and storing the electrical energy in the electric power storage device, providing electrical power from the electric power storage device during a third operating mode of the hybrid power system, collecting engine emission information during the first operating mode, the second operating mode, and the third operating mode, and evaluating compliance of an emission constituent of the engine with at least one requirement as a function of the information. These exemplary methods include a number of forms.

In some forms the method includes powering a motor with the electrical power to generate torque. In some forms the generator and the motor are structured with a stator and a rotor in common. Some forms include accelerating a turbocharger with power from the motor. Some forms include fueling the engine with a diesel fuel where the producing of the mechanical power with the engine is performed without exhaust gas recirculation. Some forms include turbocharging the engine and selectively engaging and disengaging a clutch positioned between the engine and the generator to provide parallel hybrid operation of the hybrid power system. Some forms include powering a heater with electrical power from the electric power energy storage device. Some forms include operating the engine without exhaust gas recirculation. In some forms the second operating mode includes decelerating the engine. Some forms include selectively engaging and disengaging a clutch positioned between the engine and the generator.

Certain exemplary embodiments are methods including providing a hybrid power system including an internal combustion engine, an electric power generator, and an electrical energy storage device, performing an evaluation of one or more exhaust constituents from the engine relative to one or more emission requirements, which includes running the engine to produce mechanical power during a first portion of the evaluation, and during a second portion of the evaluation, providing electricity from the electrical energy storage device while the engine is off. These exemplary methods include a number of forms.

Some forms include converting mechanical energy to the electrical energy with the generator to decelerate the engine and storing the electrical energy in the electric power storage device. Some forms include reducing exhaust emission from the engine with aftertreatment equipment, and powering an electric heater in the aftertreatment equipment with the electricity. Some forms include powering a motor with the electricity to produce torque. In some forms the aftertreatment equipment includes a diesel oxidation catalyst, a diesel particulate matter filter downstream of the diesel oxidation catalyst, and a multibed selective catalytic reduction device downstream of the diesel particulate matter filter. Some forms include powering a motor with the electricity to produce torque. In some forms the generator and the motor are structured with a stator and a rotor in common. Some forms include turbocharging the engine, fueling the engine with diesel fuel; and selectively engaging and disengaging a clutch positioned between the engine and the generator. Some forms include operating the engine without exhaust gas recirculation. Some forms include permitting the engine to generate an exhaust emission in excess of an emission level for during the first portion, converting kinetic energy into electrical energy with the generator, and offsetting the emission in excess of the emission level by generating mechanical power with a motor powered by the electrical energy during the second portion.

Certain exemplary embodiments are methods including operating a hybrid power system including a diesel-fueled internal combustion engine, an electric power generator, an electric motor, and an electrical energy storage device, generating an exhaust emission in excess of an emission requirement with the engine during a first operating mode of the hybrid power system, converting kinetic energy into electrical energy with the generator, powering the motor with electricity from the electric power storage device during a second operating mode of the hybrid power system, and offsetting the emission in excess of the emission level by generating mechanical power with the motor. These exemplary methods include a number of forms.

Some forms include propelling a vehicle with the hybrid power system, and decelerating the vehicle during the converting of the kinetic energy. Some forms include reducing exhaust emission from the engine with aftertreatment equipment, and powering an electric heater of the aftertreatment equipment with the electricity. Some forms include powering one or more vehicle accessories with the electricity. Some forms include producing mechanical power with the motor to drive the accessories. Some forms include powering a motor with the electricity to produce vehicle propulsion torque. In some forms the generator and the motor are structured with a stator and a rotor in common. Some forms include turbocharging the engine and selectively engaging and disengaging a clutch positioned between the engine and the generator to provide parallel hybrid operation of the hybrid power system, propelling a vehicle with the hybrid power system. Some forms include operating the engine without exhaust gas recirculation. Some forms include applying an exhaust brake.

Certain exemplary embodiments are methods including providing a hybrid power system including a diesel-fueled internal combustion engine, an electric power generator, an electric motor, and an electrical energy storage device, running the engine to produce mechanical power without exhaust gas recirculation during a first operating mode of the hybrid power system, during a second operating mode of the hybrid power system, converting kinetic energy to electrical energy with the generator and storing the electrical energy in the electric power storage device, and providing electrical power from the electric power storage device during a third operating mode of the hybrid power system with the engine off. These exemplary methods include a number of forms.

Some forms include propelling a vehicle with the hybrid power system and decelerating the vehicle during the converting of the kinetic energy. Some forms include reducing exhaust emission from the engine with aftertreatment equipment and powering an electric heater of the aftertreatment equipment with the electricity. Some forms include powering one or more vehicle accessories with the electricity. Some forms include producing mechanical power with the motor to drive the accessories. Some forms include powering a motor with the electricity to produce vehicle propulsion torque. In some forms the generator and the motor are structured with a stator and a rotor in common. Some forms include turbocharging the engine, selectively engaging and disengaging a clutch positioned between the engine and the generator to provide parallel hybrid operation of the hybrid power system, and propelling a vehicle with the hybrid power system. Some forms include permitting the engine to generate an exhaust emission in excess of an emission level during the first operating mode, and offsetting the emission in excess of the emission level by generating mechanical power with a motor powered by the electrical energy during the second portion. Some forms include modulating at least one of a variable geometry turbine and a wastegate of a turbocharger.

Certain exemplary embodiments are methods including providing a hybrid power system including an internal combustion engine with a turbocharger, a transmission, a motor and generator operatively coupled to the internal combustion between the engine and the transmission, a clutch operatively coupled between the engine and the motor and the generator, and an electrical energy storage device operatively coupled to the motor, selectively engaging and disengaging the clutch to mechanically couple and decouple the engine and the motor, providing power to a drive train from the engine and the motor, during a braking operation, recovering kinetic energy with the generator for storage in the electrical energy storage device, and during acceleration of the engine, providing power to the turbocharger from the motor. These exemplary methods include a number of forms.

Some forms include propelling a vehicle with the hybrid power system. Some forms include generating torque with the engine and motor simultaneously. In some forms the motor and the generator have a common rotor and a common stator. Some forms include reducing exhaust emission from the engine with aftertreatment equipment, and powering an electric heater of the aftertreatment equipment with electricity from the storage device. Some forms include powering one or more vehicle accessories with electricity from the storage device. Some forms include producing mechanical power with the motor to drive the accessories. Some forms include powering a motor with electricity from the storage device to produce vehicle propulsion torque. Some forms include permitting the engine to generate an exhaust emission in excess of an emission level during a first operating mode, and offsetting the emission in excess of the emission level by generating mechanical power with a motor powered by the electrical energy during a second operating mode. Some forms include modulating a wastegate of the turbocharger.

Certain exemplary embodiments are methods including providing a hybrid power system including an internal combustion engine, a motor, a generator, a clutch operatively coupled between the engine and the motor and the generator, and an electrical energy storage device operatively coupled to the motor and the generator, processing exhaust from the engine with aftertreatment equipment including a selective catalytic reduction device with two or more beds, sensing a characteristic of the exhaust flow between two of the beds of the selective catalytic reduction device, selectively engaging and disengaging the clutch to mechanically couple and decouple the engine from the motor and the generator, and during a braking operation, recovering kinetic energy for storage in the electrical energy storage device with the generator. These exemplary methods include a number of forms.

Some forms include propelling a vehicle with the hybrid power system, and decelerating the vehicle during the recovering of the kinetic energy. Some forms include reducing regulated emissions from the engine with the aftertreatment equipment and powering an electric heater of the aftertreatment equipment with electricity from the storage device. Some forms include powering one or more vehicle accessories with electricity from the storage device. Some forms include producing mechanical power with the motor to drive the accessories. Some forms include powering a motor with electricity from the storage device to produce vehicle propulsion torque. In some forms the generator and the motor are structured with a stator and a rotor in common and the two or more beds includes a first bed with a first catalytic composition and a second bed with a second catalytic composition different than the first catalytic composition, the sensing of the characteristic being between the first bed and the second bed, and the characteristic corresponds to at least one of temperature of the exhaust flow and ammonia content of the exhaust flow.

Some further forms include introducing a dosant in the exhaust flow upstream of the selective catalytic reduction device, decomposing the dosant to provide ammonia in the exhaust flow in the selective catalytic reduction device, and processing the exhaust flow with the second catalytic composition of the second bed to reduce ammonia slip out of an exhaust discharge of the hybrid system. Some forms include sensing another exhaust flow constituent corresponding to NOx downstream of the selective catalytic reduction device. Some forms include sensing another exhaust flow constituent corresponding to particulate matter downstream of the selective catalytic reduction device. In some forms the engine is of a diesel-fueled type and the exhaust aftertreatment equipment includes a diesel particulate matter filter. In some forms the exhaust aftertreatment equipment includes a diesel oxidation catalysts upstream of the diesel particulate matter filter. In some forms the engine includes a turbocharger with a wastegate and the engine is of a diesel-fueled type, and which includes modulating the wastegate. In some forms the exhaust flow characteristic corresponds to ammonia content of the exhaust flow in the selective catalytic reduction device. In some forms the exhaust flow characteristic corresponds to temperature of the exhaust flow in the selective catalytic reduction device.

Some exemplary embodiments are methods including providing a hybrid power system including an internal combustion engine of a compression ignition type, a motor, a generator, a clutch operatively coupled between the engine and the motor and the generator, and an electrical energy storage device operatively coupled to the motor and the generator, and presenting a representation the hybrid power system complies with an exhaust emission requirement, the representation being based on an evaluation of one or more exemplars of the hybrid power system over a test cycle that account for operation of the hybrid power system overall rather than operation of the engine alone over the test cycle. These exemplary methods include a number of forms.

Some forms include propelling a vehicle with the hybrid power system. Some forms include running the engine to produce mechanical power in a first operating mode with exhaust emissions in excess of a predefined level, and offsetting the excess during a second operating mode by providing electricity from the electrical energy storage device while the engine is off. Some forms include allowing zero engine speed in correspondence to idling during the test cycle, and accounting for capture of kinetic energy during engine motoring during the test cycle. Some forms include operating the engine without exhaust gas recirculation. Some forms include a turbocharger and which includes modulating a wastegate of the turbocharger. In some forms the engine is diesel-fueled and includes a diesel oxidation catalyst, a diesel particulate filter, and a selective catalytic reduction device. Some forms include applying an exhaust brake.

Some exemplary embodiments are hybrid power system including an internal combustion engine of a compression ignition type, a motor and a generator, a clutch to selectively couple the engine to and decouple the engine from the motor and the generator, an electric energy storage device, aftertreatment equipment to reduce exhaust emissions from the engine, the aftertreatment equipment including a selective catalytic reduction device, the selective catalytic reduction device including two or more beds, a first sensor to provide a first sensor signal corresponding to an exhaust flow constituent between the beds of the selective catalytic reduction device, and a controller responsive to first signal to regulate operation of the aftertreatment equipment. These exemplary systems include a number of forms.

In some forms the engine includes a turbocharger with a wastegate. Some forms include a second sensor to provide a second signal corresponding to temperature of the exhaust flow and wherein the first signal is representative of ammonia in the exhaust flow. In some forms the aftertreatment equipment includes an electrically powered heater operatively coupled to the storage device to selectively increase temperature of the exhaust flow into the selective catalytic reduction device. In some forms the aftertreatment equipment includes a diesel particulate filter upstream of the heater and a diesel oxidation catalyst upstream of the diesel particulate filter. In some forms the controller is further structured to execute operating logic to engage the clutch, activate the motor and run the engine to provide torque from the motor and the engine simultaneously. In some forms the controller is further structured to execute the operating logic to disengage the clutch and activate the motor to provide motor torque. In some forms the motor and generator are in the form of a integral unit having a stator and a rotor in common.

Some exemplary embodiments are hybrid power systems including an internal combustion engine, a generator, and an electric power storage device, means for performing a first operating mode of the hybrid power system by running the engine to produce mechanical power, means for performing a second operating mode of the hybrid power system to convert mechanical energy to electrical energy with the generator and storing the electrical energy in the electric power storage device, means for performing a third operating mode of the hybrid power system to provide electrical power from the electric power storage device, means for collecting engine emission information during the first operating mode, the second operating mode, and the third operating mode and evaluating compliance of an emission constituent of the engine with at least one requirement as a function of the information. These exemplary systems include a number of forms including those described herein.

Some exemplary embodiments are hybrid power systems including an internal combustion engine of a diesel-fueled, compression ignition type with a turbocharger, the turbocharger including a wastegate, a motor and a generator, a clutch to selectively couple the engine to and decouple the engine from the motor and the generator, an electric energy storage device electrically coupled to the motor to selectively provide electrical power to drive the motor and the generator to selectively receive electrical energy therefrom, aftertreatment equipment to reduce exhaust emissions from the engine, the aftertreatment equipment including a selective catalytic reduction device, an electrically powered heater coupled to the storage device to selectively receive electrical energy therefrom, and a first sensor to provide a first signal corresponding to temperature of exhaust flow in the selective catalytic reduction device, and a controller responsive to first signal to regulate operation of the aftertreatment equipment and selectively increase temperature of an exhaust flow from the engine into the selective catalytic reduction device, the controller being further structured to execute operating logic to actuate the clutch to couple the engine and the motor together to provide torque from the engine and the motor simultaneously and to modulate operate of the wastegate to regulate operation of the aftertreatment equipment. These exemplary systems include a number of forms.

Some forms include means for filtering soot in the exhaust flow. In some forms the motor and the generator are structured with a rotor and a stator in common. In some forms the aftertreatment equipment includes a diesel oxidation catalyst to receive exhaust from the engine upstream of the selective catalytic reduction device and a diesel particulate filter downstream of the diesel oxidation catalyst and upstream of the selective catalytic reduction device. In some forms the aftertreatment device includes a decomposition conduit that receives an exhaust flow from the diesel particulate filter and is in fluid communication with the selective catalytic reduction device and a dosant source to introduce a dosant into the decomposition conduit that decomposes to provide ammonia into the exhaust flow received by the selective catalytic reduction device. In some forms the controller includes means to limit operation of the engine to an optimized engine speed range and means for supplementing engine torque with torque produced by the motor. Some forms include an exhaust brake regulated by the controller. Some forms include a vehicle propelled by the torque from the engine and the motor. Some forms include means for driving accessories with the motor while the engine is not running. In some forms the engine does not include exhaust gas recirculation equipment.

Some exemplary embodiments are methods including providing a hybrid power system including an internal combustion engine of a compression ignition type, a motor, a generator, a clutch operatively coupled between the engine and the motor and the generator, and an electrical energy storage device operatively coupled to the motor and the generator, testing the hybrid power system for compliance with one or more hybrid-specific exhaust emission requirements, the hybrid-specific requirements being based on performance of the hybrid power system over as a power source rather the engine alone, and where the requirement permits a level of emissions of the engine not permitted by one or more engine-specific emissions requirements applicable to compliance of the engine alone. These exemplary methods include a number of forms.

In some forms testing the hybrid system includes operating the engine to produce mechanical torque and an engine exhaust emission during a first part of an established test cycle and offsetting the engine exhaust emission by establishing a zero engine speed while the engine is idling during a second part of the established test cycle. In some forms the testing of the hybrid system further includes offsetting the engine exhaust emission by providing further torque with the motor powered by electricity recovered by converting kinetic energy with the generator while the engine is motoring. Some forms include designing the hybrid power system to reduce NOx emission of the engine with aftertreatment equipment, and powering an electric heater in the aftertreatment equipment with electricity from the storage device that was provided with the generator converting kinetic energy to electrical energy. In some forms the hybrid power system includes aftertreatment equipment, and the aftertreatment equipment includes a diesel oxidation catalyst, a diesel particulate matter filter downstream of the diesel oxidation catalyst, and a multi-bed selective catalytic reduction device downstream of the diesel particulate matter filter. In some forms the engine includes a turbocharger with a wastegate. In some forms the hybrid power system includes a controller designed to modulate the wastegate with a controller included in the hybrid power system. In some forms the hybrid power system includes and exhaust brake. In some forms the motor and generator are each structured with a stator and a rotor in common. Some forms include designing the engine to be more fuel efficient under the hybrid-specific emission requirements than the engine-specific emissions requirements. Some forms include designing the engine to operate over a narrower speed range for the hybrid-specific emission requirements than would be required to meet the engine-specific emissions requirements. Some forms include designing the hybrid power system to provide torque from the engine and the motor simultaneously. In some forms the testing includes applying a Dynamometer.

While various inventions have been illustrated and described in detail in the drawings, foregoing description, and/or any claims that follow; the same is to be considered as illustrative and not restrictive in character—it being understood that only certain exemplary embodiments have been set forth herein and that all changes, modifications, and/or equivalents are intended to be encompassed thereby. It should be understood that while the use of words such as preferable, preferably, preferred or more preferred utilized in the description may indicate that the feature so described may be more desirable, it nonetheless may not be necessary and embodiments lacking the same may be contemplated as within the scope of the inventions defined herein. In reading any claims included in the present application, it is intended that when words such as "a," "an," "at least one," or "at least one portion" are used there is no intention to limit the claim to only one item unless specifically stated to the contrary in the subject claim. When the language "at least a portion" and/or "a portion" is used the item can include a portion and/or the entire item unless specifically stated to the contrary.

The invention claimed is:

1. A method of testing emissions of a diesel-electric hybrid powertrain, the method comprising:
    providing a powertrain including a diesel engine, a motor/generator integrated with the engine to provide brake torque at a common output shaft, and an energy storage system configured to selectably receive electrical energy from the motor/generator and provide electrical energy to the motor/generator;
    directly coupling the output shaft to a dynamometer;
    operating the powertrain according to a predetermined schedule of operating criteria to provide brake torque at the output shaft using a combination of the engine operating alone, the motor/generator operating alone, and the engine operating with the motor/generator; and
    determining emissions of NOx, particulate matter, hydrocarbon, CO, and $CO_2$ over the predetermined schedule of operating criteria;
    wherein during the operating a predetermined limit is imposed on operation of the powertrain to capture energy from the motor/generator operating alone.

2. A method according to claim 1 wherein the predetermined limit is based upon a model accounting for a differential ratio, a differential efficiency, a wheel size, a tire characteristic, and a road grade.

3. A method according to claim 1 wherein the predetermined limit is based upon a fraction of positive work at the common output shaft during the predetermined schedule.

4. A method according to claim 1 wherein the predetermined limit is based upon a simulation of kinetic energy of a vehicle varying over the predetermined schedule.

5. A method according to claim 1 wherein emissions from the powertrain are within respective limits for particulate matter, NOx, hydrocarbon, and CO.

6. A method according to claim 5 wherein the respective limits comprise particulate matter less than or equal to 0.01 grams per brake horsepower hour, NOx less than or equal to 0.20 grams per brake horsepower hour, non-methane hydrocarbon less than or equal to 0.14 grams per brake horsepower hour, CO less than or equal to 15.5 grams per brake horsepower hour.

7. A method according to claim 1 wherein $CO_2$ emissions from the powertrain are less than or equal to 500 grams per brake horsepower hour over a test cycle including transients.

8. A method according to claim 1 wherein the predetermined schedule specifies output shaft torque as a percentage of a maximum output shaft torque of the system as a function of time.

9. A method according to claim 1 wherein the common output shaft is a pre-transmission output shaft.

10. A method according to claim 1 wherein the common output shaft is a post-transmission output shaft.

11. A method according to claim 1 wherein the predetermined schedule comprises a schedule of target brake torque as a function of time.

12. A method according to claim 11 wherein the schedule of target brake torque specifies a percentage of maximum brake torque as a function of time.

13. A method according to claim 1 wherein the predetermined schedule comprises a schedule of target vehicle speed as a function of time.

14. A method according to claim 13 wherein a vehicle simulation determines a simulated vehicle speed based upon dynamometer torque, dynamometer speed, and vehicle model characteristics, outputs a command to control output of the powertrain based upon the simulated vehicle speed and the target vehicle speed, and outputs a command to control the dynamometer based upon the vehicle model characteristics.

15. A method according to claim 13 wherein the vehicle model characteristics include a vehicle mass, a rolling resistance, and a vehicle drag.

16. A method according to claim 15 wherein the vehicle model characteristics include a road grade, and an accessory load.

17. A method according to claim 13 wherein output of the powertrain is controlled to meet the schedule of target vehicle speed using a vehicle model simulation.

18. A vehicle powertrain test system comprising:
a diesel engine configured to operate only with non-homogeneous combustion;
a turbocharger operatively coupled with the engine;
a motor/generator integrated with the engine to provide brake torque at a common output shaft;
a dynamometer coupled directly to the output shaft;
an energy storage system configured to selectably provide electrical energy to the motor/generator and receive electrical energy from the motor/generator;
an exhaust aftertreatment system configured to reduce emissions of one or more of particulate matter, NOx, hydrocarbon, and CO; and
a controller configured to selectably control the engine and the motor/generator to provide brake torque and output shaft speed meeting a predetermined schedule of operating criteria while meeting predetermined emissions criteria including respective limits on particulate, NOx, hydrocarbon, CO and $CO_2$ emissions;
wherein the engine and the exhaust aftertreatment system alone are incapable of providing brake torque meeting the predetermined schedule and meeting the predetermined emissions criteria.

19. A system according to claim 18 wherein the engine operates with a ratio of intake manifold pressure to exhaust manifold pressure greater than 1 and the incapability of the engine and the exhaust aftertreatment system is attributable to an inability of the aftertreatment system to reduce emissions of the engine if the engine is operated alone to meet output required by the predetermined schedule of operating criteria.

20. A system according to claim 18 wherein engine is configured without EGR.

21. A system according to claim 18 wherein operating the engine without the motor generator to meet the predetermined schedule of operating criteria provides an aftertreatment system temperature insufficient to meet the predetermined emissions criteria and the motor/generator loads the engine effective to increase temperature of the aftertreatment system to allow the aftertreatment system to meet the predetermined emissions criteria.

22. A system according to claim 18 wherein the incapability of the engine and the exhaust aftertreatment system is attributable the engine having insufficient maximum output to meet the predetermined schedule of operating criteria, and the controller is configured to meet the predetermined criteria using torque from the motor/generator.

23. A system according to claim 18 wherein the incapability of the engine and the exhaust aftertreatment system is attributable the controller limiting engine output to a level insufficient to meet the predetermined schedule of operating criteria, and the controller is configured to meet the predetermined criteria by controlling the motor/generator to provide torque.

24. A system according to claim 18 wherein the predetermined emissions criteria comprises:
particulate matter less than or equal to 0.01 grams per brake horsepower hour,
NOx less than or equal to 0.20 grams per brake horsepower hour,
non-methane hydrocarbon less than or equal to 0.14 grams per brake horsepower hour,
CO less than or equal to 15.5 grams per brake horsepower hour, and
and $CO_2$ less than or equal to 500 grams per brake horsepower hour over a test cycle including transients.

25. A system according to claim 18 wherein the aftertreatment system is configured without a diesel particulate filter and is configured to reduce particulate emissions with a partial flow particulate filter having lower particulate reduction capacity than a diesel particulate filter.

26. A system according to claim 18 wherein the aftertreatment system is configured without a particulate filter.

27. A system according to claim 18 wherein the predetermined schedule of operating criteria include a schedule specifying output shaft torque and output shaft speed as a function of time.

28. A system according to claim 18 wherein the predetermined criteria include a schedule specifying vehicle speed as a function of time.

29. A system according to claim 18 wherein operating the engine without the motor generator to meet the predetermined schedule of operating criteria provides an aftertreatment system temperature insufficient to meet the predetermined emissions criteria and the motor/generator loads the engine effective to increase temperature of exhaust provided to the aftertreatment system to allow the aftertreatment system to meet the predetermined emissions criteria.

30. A system according to claim 18 wherein operating the engine to meet low load output requirements of the predetermined schedule of operating criteria provides aftertreatment system temperature insufficient to meet the predetermined emissions criteria and the system operates the engine only at loads providing aftertreatment system temperature sufficient to meet the predetermined emissions criteria and operates the motor/generator alone at to meet low load output requirements.

31. A vehicle powertrain system according to claim 18 wherein the incapability of the engine and the exhaust aftertreatment system is attributable to a delay in transient torque response of the engine, and the controller is configured compensate for the incapability by controlling the motor/generator to provide positive brake torque during the delay using electrical energy from the energy storage system.

32. A system according to claim 31 wherein the delay in transient torque response of the engine is attributable to a fixed geometry and size of the turbocharger.

33. A system according to claim 31 wherein the controller is configured with a first control routine that determines the maximum torque available from the engine within an emissions limit and a second control routine that determines torque provided by the motor/generator based upon a net torque demand and the maximum torque.

34. A system according to claim 31 wherein the delay in transient torque response of the engine is attributable to a command from the controller to limit transient torque response of the engine effective to limit emissions generated by the engine.

35. A system according to claim 34 wherein the command is effective to limit particulate generated by the engine.

36. A system according to claim 34 wherein the command is effective to limit NOx generated by the engine.

37. A system according to claim 34 wherein the command is effective to limit particulate and NOx generated by the engine.

* * * * *